(12) United States Patent
Onuma et al.

(10) Patent No.: US 11,084,405 B2
(45) Date of Patent: Aug. 10, 2021

(54) VEHICLE SEAT HAVING INTERNAL SUPPORT MEMBER

(71) Applicants: TS TECH CO., LTD., Asaka (JP); HONDA MOTOR CO., LTD., Tokyo (JP)

(72) Inventors: Koji Onuma, Tochigi (JP); Soichiro Kamei, Tochigi (JP); Masaki Shimazu, Wako (JP); Akira Nakajima, Wako (JP); Hiromitsu Nagatomo, Wako (JP); Yuki Fukuda, Wako (JP); Toshimitsu Mizukoshi, Wako (JP); Taiji Misono, Wako (JP); Kota Yamamoto, Wako (JP)

(73) Assignees: TS TECH CO., LTD., Saitama (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/778,401

(22) Filed: Jan. 31, 2020

(65) Prior Publication Data

US 2020/0247292 A1 Aug. 6, 2020

(30) Foreign Application Priority Data

Feb. 1, 2019 (JP) .............................. JP2019017501
Feb. 1, 2019 (JP) .............................. JP2019017503
(Continued)

(51) Int. Cl.
*B60N 2/66* (2006.01)
*B60N 2/58* (2006.01)
*B60N 2/68* (2006.01)

(52) U.S. Cl.
CPC ............. *B60N 2/686* (2013.01); *B60N 2/682* (2013.01)

(58) Field of Classification Search
CPC .............................. B60N 2/686; B60N 2/5825
See application file for complete search history.

(56) References Cited

U.S. PATENT DOCUMENTS

| 2,366,680 A | 1/1945 | Valentine et al. |
| 5,799,970 A * | 9/1998 | Enders ................... B60R 21/207 |
| | | 280/728.2 |

(Continued)

FOREIGN PATENT DOCUMENTS

| DE | 4118396 C1 * | 9/1992 | ........... B60N 2/5825 |
| DE | 4313813 A1 * | 11/1994 | ........... B60N 2/5825 |

(Continued)

*Primary Examiner* — Timothy J Brindley
(74) *Attorney, Agent, or Firm* — Armstrong Teasdale LLP

(57) ABSTRACT

A vehicle seat includes: a frame provided in at least one of a seat cushion and a seat back; an internal support member for supporting an occupant, the internal support member including a main body in plate or sheet form positioned within the frame and extending substantially in parallel with the frame, and a pair of inclined portions extending laterally outward from at least a part of either lateral side of the main body with a slant away from the frame; a pad placed on a front side of the frame and the internal support member; a skin member covering the pad; and a clip securing another member to one of the inclined portions. The one inclined portion is formed with a tubular portion projecting from a back side thereof orthogonally to the main body, the tubular portion internally defining a mounting hole receiving the clip therein.

7 Claims, 15 Drawing Sheets

(30) Foreign Application Priority Data

Feb. 1, 2019 (JP) .............................. JP2019017505
Feb. 1, 2019 (JP) .............................. JP2019017507

(56) References Cited

U.S. PATENT DOCUMENTS

| | | | |
|---|---|---|---|
| 5,984,419 A * | 11/1999 | Partington | B60N 2/0232 297/216.13 |
| 8,662,483 B2 | 3/2014 | Yamaguchi et al. | |
| 9,630,525 B2 | 4/2017 | Nakazaki et al. | |
| 10,532,679 B2 | 1/2020 | Onuma et al. | |
| 10,538,212 B2 | 1/2020 | Onuma | |
| 10,654,385 B2 | 5/2020 | Onuma et al. | |
| 10,857,958 B2 | 12/2020 | Onuma | |
| 2007/0267282 A1 | 11/2007 | Sallam et al. | |
| 2010/0133732 A1 | 6/2010 | Yamaguchi et al. | |
| 2011/0049948 A1* | 3/2011 | Hobl | B60N 2/5825 297/218.2 |
| 2011/0248534 A1 | 10/2011 | Pinto | |
| 2015/0283923 A1 | 10/2015 | Kordel et al. | |
| 2015/0291072 A1 | 10/2015 | Ito | |
| 2015/0321590 A1 | 11/2015 | Mizoi et al. | |
| 2015/0343932 A1 | 12/2015 | Hosoe | |
| 2016/0221481 A1 | 8/2016 | Sugiyama et al. | |
| 2017/0036575 A1 | 2/2017 | Kobayashi et al. | |
| 2017/0113584 A1* | 4/2017 | Kumagai | B60N 2/686 |
| 2018/0037146 A1* | 2/2018 | Line | B60N 2/682 |
| 2018/0272906 A1 | 9/2018 | Onuma et al. | |
| 2018/0272908 A1 | 9/2018 | Onuma et al. | |
| 2018/0272909 A1* | 9/2018 | Misono | B60N 2/70 |
| 2018/0272969 A1 | 9/2018 | Onuma et al. | |
| 2019/0023162 A1* | 1/2019 | Isobe | B60N 2/5891 |
| 2019/0031065 A1 | 1/2019 | Kamei et al. | |
| 2019/0291615 A1* | 9/2019 | Kajale | B60N 2/5825 |
| 2020/0247270 A1 | 8/2020 | Onuma et al. | |
| 2020/0247271 A1 | 8/2020 | Onuma et al. | |
| 2020/0247292 A1 | 8/2020 | Onuma et al. | |
| 2020/0282885 A1 | 9/2020 | Onuma | |
| 2020/0298736 A1* | 9/2020 | Morrow | B60N 2/665 |

FOREIGN PATENT DOCUMENTS

| | | | | |
|---|---|---|---|---|
| DE | 102015203910 A1 * | 9/2015 | | B60N 2/686 |
| DE | 102015212197 A1 * | 1/2016 | | B60N 2/5825 |
| DE | 102014222085 A1 * | 5/2016 | | B60N 2/5825 |
| DE | 102018220052 A1 * | 5/2019 | | B60N 2/64 |
| EP | 3127745 A1 * | 2/2017 | | B60N 2/42709 |
| FR | 2810594 A1 * | 12/2001 | | B60N 2/68 |
| FR | 2985467 A1 * | 7/2013 | | B60N 2/682 |
| JP | 2016144987 A | 8/2016 | | |
| JP | 2016155400 A * | 9/2016 | | B60N 2/6009 |
| JP | 2018052498 A | 4/2018 | | |
| JP | 6309130 B1 | 10/2018 | | |
| WO | WO-2006095454 A1 * | 9/2006 | | B60N 2/99 |

* cited by examiner

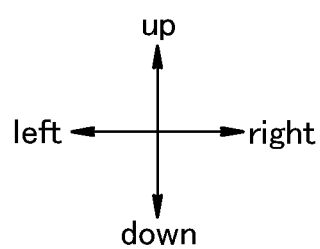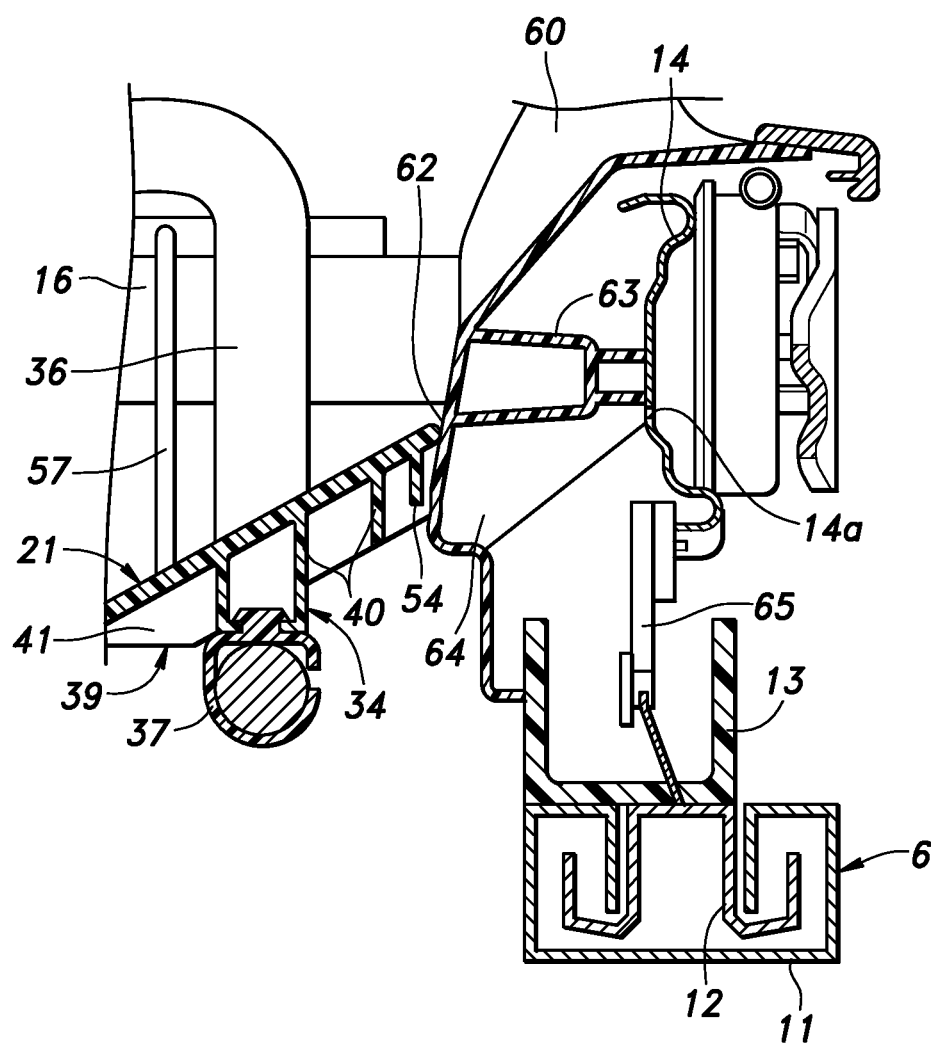
Fig.3

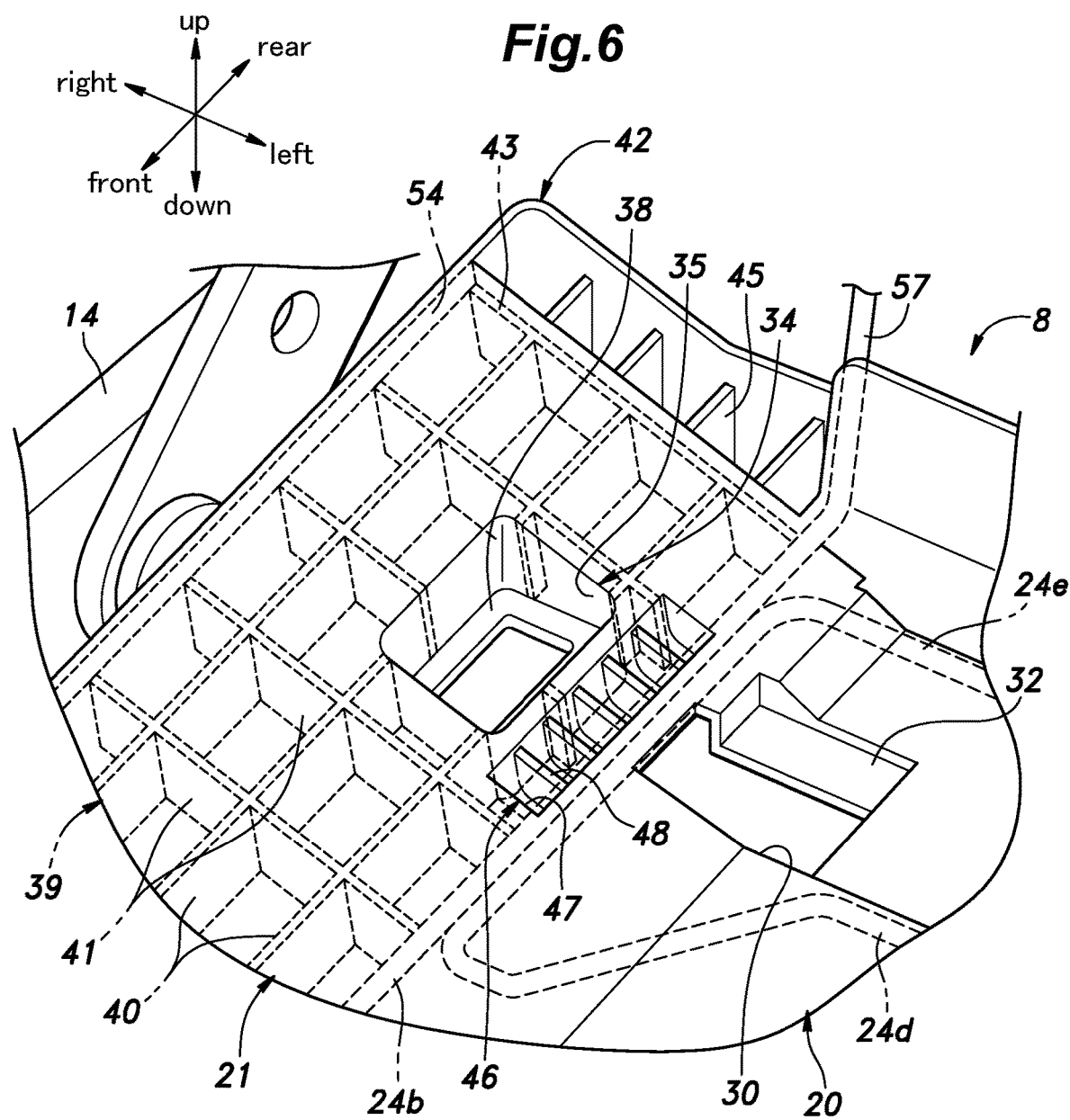

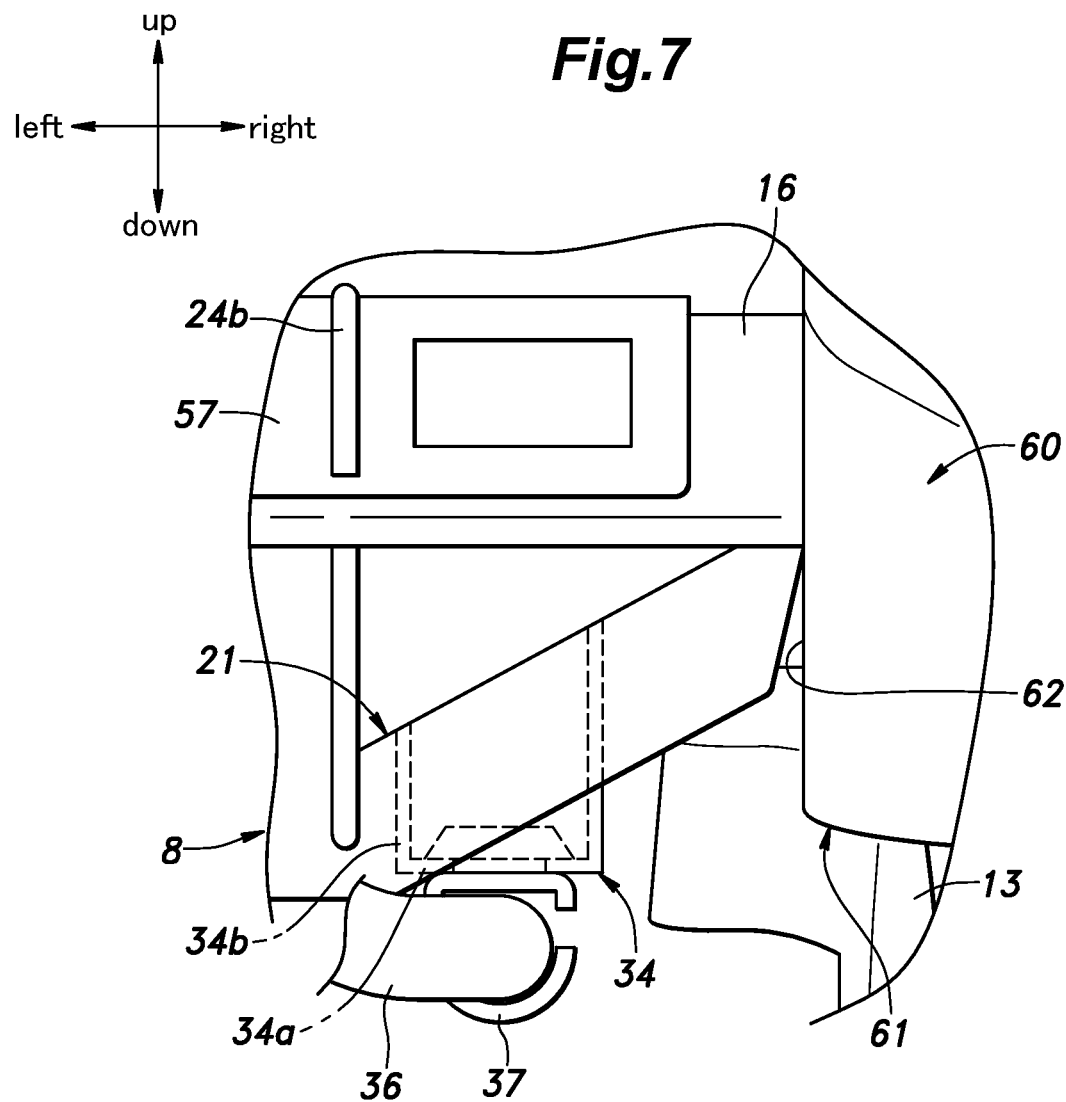

VEHICLE SEAT HAVING INTERNAL SUPPORT MEMBER

TECHNICAL FIELD

The present invention relates to a vehicle seat, and more particularly to a vehicle seat having an internal support member provided inside a seat cushion frame or a seat back frame to support an occupant.

BACKGROUND ART

Vehicle seats provided with an internal support member are known in the art. JP6309130B1 discloses an internal support member made of a plastic sheet or plate member and placed inside a seat cushion frame to support a seat occupant. The internal support member includes a pair of inclined portions which are located on either side of a rear part thereof and inclining upward toward laterally outer sides thereof. The inclined portions support the hip of the occupant from either side thereof so that a large part of the pressure is supported by the inclined portions. The internal support member may be provided with a plurality of hooks along the front edge and the rear edge thereof, and these hooks are engaged by the front cross member and the rear cross member which form a part of the seat cushion frame. It is known to provide a seat heater between the skin member and the pad of a vehicle seat. See JP2018-052498A, for instance.

In recent years, the vehicles are fitted with a large amount of wire harness, and the trend for increased sophistication of seat adjustment is causing the number of cables installed in the seat to be increased. Such a wire harness or cables are typically secured to the vehicle seat by using clips so that a large number of mounting portions are required to be provided on the internal support member. In the case of seats having inclined portions as is the case with the vehicle seat disclosed in JP6309130B1, such mounting portions are provided on the back side of the inclined portions. However, when a mounting portion is provided on an inclined surface, the assembly work associated with the mounting of the clip tends to be poor in efficiency.

SUMMARY OF THE INVENTION

In view of such a problem of the prior art, a primary object of the present invention is to provide a vehicle seat having an internal support member made of a sheet or plate material having a pair of inclined portions, in which the assembly work for mounting clips to the inclined portions is facilitated.

To achieve such an object, the present invention provides a vehicle seat (1) having a seat cushion (2) and a seat back (3), the vehicle seat comprising: a frame (7) provided in at least one of the seat cushion and the seat back; an internal support member (8) for supporting an occupant, the internal support member including a main body (20) in plate or sheet form positioned within the frame and extending substantially in parallel with the frame, and a pair of inclined portions (21) extending laterally outward from at least a part of either lateral side of the main body with a slant away from the frame; a pad (9) placed on a front side of the frame and the internal support member; a skin member (10) covering the pad; and a clip (37) securing another member to one of the inclined portions; wherein the one inclined portion is formed with a tubular portion (34) projecting from a back side thereof orthogonally to the main body, the tubular portion internally defining a mounting hole (35) receiving the clip therein.

Since the tubular portion is provided on the back side of the inclined portion so as to extend orthogonally to the main body, the mounting of the clip to the inclined portion can be performed in an efficient manner.

Preferably, in this vehicle seat, the mounting hole is passed through the one inclined portion, and a shoulder surface (38) facing toward a front side of the inclined portion is formed in an inner circumferential surface of the tubular portion, and the clip is passed into the mounting hole from a back side of the internal support member to be engaged by the shoulder surface and retain the other member on the back side of the internal support member.

Thereby, the reduction in the stiffness of the internal support member owing to the presence of the mounting hole is compensated for by the presence of the annular surface, and the seating comfort is prevented from being impaired because the clip is engaged by the shoulder surface without protruding from the front surface of the inclined portion.

Preferably, in this vehicle seat, the other member is an elongated member which extends in a longitudinal direction.

Thus, an elongated member such as a wire harness can be secured to the inclined portion in a favorable manner.

Preferably, in this vehicle seat, the inclined portions are each provided with a plurality of mounting holes.

Thereby, a plurality of elongated members can be secured to the inclined portions.

Preferably, in this vehicle seat, the mounting holes provided in the inclined portions are laterally offset from one another.

Thereby, the elongated members extending in the longitudinal direction can be attached to the inclined portions close to one another, and the mechanical strength of the inclined portions is prevented from being reduced due to the presence of the mounting holes.

Preferably, in this vehicle seat, the mounting holes provided in the inclined portions are longitudinally offset from one another.

Thereby, the work efficiency in securing the elongated members to the mounting holes can be improved.

Preferably, in this vehicle seat, each inclined portion is provided with a longitudinal end reinforcing portion (42, rear part reinforcing portion) including an upright wall (43) extending substantially perpendicularly from a longitudinal end of the inclined portion toward the back side of the inclined portion, a bottom wall (44) extending from a free end of the upright wall in the longitudinally outward direction or at an angle to the longitudinally outward direction along an extension plane of a surface of the inclined portion, and a reinforcing wall (45) fixedly connected to the upright wall and the bottom wall substantially in an orthogonal relationship.

Thereby, the inclined portions can be given with a suitable stiffness.

According to the conventional internal support member, since the internal support member is engaged by the seat cushion frame at the front edge and the rear edge thereof, the lateral positioning of the internal support member relative to the seat cushion frame was necessary. Therefore, the assembly work in installing the internal support member to the seat cushion frame tends to be time consuming. Also, after being installed to the seat cushion frame, the internal support member could inadvertently move laterally relative to the seat cushion frame. Thus, an object of a certain embodiment of the present invention is to provide a vehicle seat in which the internal support member can be easily and correctly positioned relative to the seat cushion frame or the seat back frame when installing the internal support member to the seat cushion frame.

To achieve such an object, the present invention provides a vehicle seat (1) having a seat cushion (2) and a seat back (3), the vehicle seat comprising: a frame (7) provided in at least one of the seat cushion and the seat back; and an internal support member (8) for supporting an occupant supported by the frame so as to be inside the frame; wherein the frame includes a pair of side members (14), and a pair of cross members (15, 16) connected between the respective ends of the side members, and the side members are provided with cover members (60) at least partly covering mutually opposing sides of the side members, respectively, and wherein the internal support member includes a main body (20) in plate or sheet form extending substantially in parallel with the frame, and a pair of inclined portions (21) extending laterally outward from either lateral side of the main body with a slant away from the frame, each inclined portion abutting against the corresponding cover member, and having a first reinforcing portion (39, grid-like reinforcing portion) formed on the back surface of the inclined portion for reinforcing the inclined portion in stiffness.

By having each inclined portion abut against the corresponding cover member, the internal support member can be positioned relative to the frame with ease. Thereby, the assembly work in mounting the internal support member to the frame can be facilitated. Once assembled, the internal support member can be prevented from shifting laterally relative to the frame. Further, the first reinforcing portions increase the stiffness of the inclined portions, and reduce the deformation of the inclined portions. As a result, the internal support member can be positioned relative to the frame in an accurate and reliable manner.

Preferably, in this vehicle seat, each cover member is supported by the corresponding side member.

Since the cover member is supported by the side member, the position of the cover member is prevented shifting during use.

Preferably, in this invention, each cover member is provided with a second reinforcing portion for reinforcing the cover member in stiffness, and the second reinforcing portion is located on a lateral extension line of the first reinforcing portion along the surface of the corresponding inclined portion.

Thereby, the stiffness of the cover member is increased by the second reinforcing portion, and the deformation of the cover member can be avoided. As a result, the position of the internal support member relative to the frame can be stabilized.

Preferably, in this vehicle seat, each first reinforcing portion includes at least one first rib (41) extending linearly, and each second reinforcing portion includes at least one second rib (64, cover reinforcing portion) extending linearly. Each first rib and the corresponding second rib are located on a common straight line.

Thereby, the part of the internal support member having an increased stiffness due to the first rib and the part of the internal support member having an increased stiffness due to the second rib are provided one next to the other on each side of the seat cushion so that the deformation of the internal support member and the cover members can be minimized. As a result, the position of the internal support member relative to the frame can be stabilized.

Preferably, in this vehicle seat, each inclined portion is provided with a first mounting hole (35) configured to have a clip retaining an elongated member secured thereto and positioned on an extension line of the first rib.

Since the deformation of the first mounting hole can be prevented by the first rib so that the inadvertent dislodgement of the clip can be avoided.

Preferably, in the structure having the first rib, the first reinforcing portion includes a plurality of first ribs, and a plurality of third ribs (40, longitudinal ribs) crossing the first ribs.

According to this arrangement, the stiffness of the inclined portions is improved further, and the deformation of the inclined portions can be minimized. As a result, the position of the internal support member relative to the frame can be stabilized.

Preferably, in this vehicle seat where each cover member is supported by the corresponding side member, the cover member is provided with a boss (63) abutting against the side member at the tip end thereof, and the side member is provided with a second mounting hole (14*a*) configured to engage the clip in a part thereof adjoining the tip end of the boss.

The boss reduces the deformation of the cover member so that the internal support member abutting against the cover member can be stabilized. Since a space for receiving another member such as an elongated member retained by the clip can be created, the other member is prevented from being inadvertently dislodged from the clip by colliding with the cover member.

Preferably, the lower end of the cover member is in contact with the rail cover in a longitudinal range over which the inclined portion is in contact with the cover member.

Thereby, the deformation of the cover member by the rail cover is avoided so that the stability of the internal support member in contact with the cover member can be enhanced.

Preferably, in the vehicle seat in which the cover member is supported by the rail cover, the side member is positioned on an extension plane of the surface of the inclined portion.

Thereby, the mounting stiffness of the internal support member can be enhanced.

Preferably, in this vehicle seat, each inclined portion is formed by a plastic material having metal wire (24) insert molded therein.

Thereby, the stiffness of the inclined portions can be further improved, and the deformation of the inclined portions can be reduced. As a result, the position of the internal support member relative to the frame can be stabilized.

In the conventional internal support member having a pair of inclined portions on either side thereof, the loading of the occupant could be concentrated in the inclined portions depending on the way the occupant is seated in the vehicle seat, and there was a need to reinforce the inclined portions. A certain aspect of the present invention provides a vehicle seat in which the inclined portions are favorably reinforced.

To achieve such an object, the present invention provides a vehicle seat (1) having a seat cushion (2) and a seat back (3), the vehicle seat comprising: a frame (7) provided in at least one of the seat cushion and the seat back; and an internal support member (8) for supporting an occupant supported by the frame so as to be inside the frame; wherein the frame includes a pair of side members (14), and a pair of cross members (15, 16) connected between the respective ends of the side members, and the side members are provided with cover members (60) at least partly covering mutually opposing sides of the side members, respectively, and wherein the internal support member includes a main body (20) in plate or sheet form extending substantially in parallel with the frame, and a pair of inclined portions (21)

extending laterally outward from either lateral side of the main body with an slant away from the frame, each inclined portion abutting against the corresponding cover member, and having a connecting part reinforcing portion (46) including a connecting recess (47) formed on an upper surface of a connecting part between the main body and the inclined portion, and a connecting rib (48) provided inside the connecting recess.

The connecting part reinforcing portion reinforces the connecting part between the inclined portion and the main body. By suitably selecting the orientation, the thickness and the number of the rib(s), the internal support member may be designed such that the flexibility of the inclined portion in relation to the main body is optimally adjusted.

Preferable, in this vehicle seat, each inclined portion is provided with a mounting hole for attaching a clip thereto.

Thereby, a member such as a wire harness can be secured to the inclined portion via the clip.

Preferably, in this vehicle seat, at least a part of the connecting ribs are placed in a laterally side part of the mounting hole. The term "laterally" in this case means being substantially laterally, possibly with a certain tilt in the lateral and/or longitudinal direction.

Thereby, the part of the inclined portion whose mechanical strength may have been reduced due to the presence of the mounting hole can be reinforced by the connecting ribs.

Preferably, in this vehicle seat having the mounting hole, the connecting recess has a substantially longer longitudinal length than the mounting hole. The term "longitudinal" in this case means the direction which is substantially orthogonal to the lateral direction and extends substantially along the surface of the internal support member.

Thereby, the connecting part between the inclined portion and the main body can be reinforced over a larger longitudinal range than the mounting hole.

Preferably, in this vehicle seat having the mounting hole, each inclined portion is provided with a longitudinal end reinforcing portion (42, rear reinforcing portion) including an upright wall (43) extending substantially perpendicularly from a longitudinal end of the inclined portion toward a back side of the inclined portion, a bottom wall (44) extending from a free end of the upright wall in the longitudinally outward direction or at an angle to the longitudinally outward direction along the surface of the inclined portion, and a reinforcing wall (45) fixedly connected to the upright wall and the bottom wall substantially in an orthogonal relationship.

The longitudinal end reinforcing portion reinforces the mechanical strength of the inclined portion, and by adjusting the thickness and the number of the reinforcing wall(s), the internal support member can be designed in such a manner that the inclined portions have a suitable flexibility.

Preferably, in this vehicle seat, the mounting hole is positioned on the longitudinal extension line of at least a part of the reinforcing wall.

Thereby, the part of the inclined portion whose mechanical strength may be reduced by the mounting hole can be reinforced by the reinforcing wall.

Preferably, in this vehicle seat having the longitudinal end reinforcing portion, the reinforcing wall is located laterally outward of the connecting rib.

Since the longitudinal end reinforcing portion is located laterally outward of the connecting rib, even when the connecting part between the inclined portion and the main body is excessively reinforced, the internal support member is prevented from becoming excessively stiff, and the longitudinal end reinforcing portion is enabled to reinforce the part which is laterally outward of the connecting part in a favorable manner.

Preferably, in this vehicle seat having the longitudinal end reinforcing portion, the longitudinal end reinforcing portion is located more outward than the connecting part reinforcing portion in the longitudinally outward direction.

Since the longitudinal end reinforcing portion is longitudinally offset from the connecting part reinforcing portion, an excessive localized reinforcement and concentration of stress in other parts can be avoided.

Preferably, in this vehicle seat having the longitudinal end reinforcing portion, the connecting rib is disposed so as to be at an angle relative to the reinforcing wall.

Since the connecting rib is at an angle relative to the reinforcing wall, the connecting rib and the reinforcing rib reinforces the inclined portion in mutually different directions.

Preferably, in this vehicle seat, the connecting rib extends laterally, and the reinforcing wall extends longitudinally.

Thereby, the inclined portion can be reinforced in the longitudinal direction and in the lateral direction.

A seat heater can be provided in a vehicle seat having an internal support member in the form of a sheet which includes a pair of inclined portions formed on either side of the internal support member. A seat heater may also be provided in a vehicle seat having an internal support member in the form of a plurality of metal wires which extend in the longitudinal direction and are bent in a zig-zag fashion. The stress applied to the seat heater is different between these two cases. Therefore, when considering the measures for preventing a damage to the heat wire in the seat heater which could be caused by the stress received from the internal support member, different considerations are required between these two cases. Another object of the present invention is to provide a vehicle seat having an internal support member in the form of a sheet and having a pair of inclined portions on either side parts thereof, and a seat heater provided on the internal support member, wherein the heat wire of the seat heater is protected from damages.

To achieve such an object, the present invention provides a vehicle seat (101) having a seat cushion (102) and a seat back (103), the vehicle seat comprising: a frame (106) provided in at least one of the seat cushion and the seat back; an internal support member (107) for supporting an occupant supported by the frame so as to be inside the frame; a pad (108) placed on a front side of the frame and the internal support member; a skin member (109) covering the pad; and a seat heater (110) including a base cloth (133) placed between the pad and the skin member, and a heat wire (134) secured to the base cloth; wherein the internal support member includes a main body (115) in the form of a sheet extending substantially in parallel with the frame, and a pair of inclined portions (116) extending laterally outward from either side edge of the main body with a slant away from the frame, lateral side edges of the base cloth being positioned laterally inward of respective lateral side edges of the inclined portions.

Since the lateral side edges of the base cloth are positioned laterally inward of the respective lateral side edges of the inclined portions, the bending load which the seat heater receives is reduced as compared to the case where the lateral side edges of the base cloth are positioned laterally outward of the respective lateral side edges of the inclined portions.

By reducing the bending load on the seat heater, the damage to the heat wire contained in the seat heater can be minimized.

Preferably, in this vehicle seat, the internal support member is made of a plastic material having metal wires (119) insert molded therein, the wires including an outer longitudinal wire (119c) that extends in the longitudinal direction on a part of the corresponding inclined portion located laterally outward of the corresponding laterally outer edge of the base cloth. Here, the longitudinal direction means the fore and aft direction or vertical direction along the internal support member.

Owing to the presence of the outer longitudinal wire located laterally outward of the corresponding lateral edge of the base cloth, the bending load on the seat heater is reduced, and the damage to the heater wire in the seat heater can be minimized.

Preferably, in this vehicle seat, the wires include a lateral wire (119d-119g) which is at least partly covered by the base cloth and extends in the lateral direction.

Since the deformation of the base cloth is restricted by the lateral wire, the load on the heat wire is reduced.

Preferably, in this vehicle seat, the lateral wire includes a plurality of lateral wires spaced from one another.

Since the deformation of the base cloth is restricted by the multiple lateral wires which are spaced from each other, the load on the heat wire is reduced.

Preferably, in this vehicle seat, the wires include an annular section covered by the base cloth, and at least a part of the multiple lateral wires form a part of the annular section.

Owing to the annular section of the wires, the deformation of the base cloth is restricted by the annular section of the wires so that the load on the heat wire is reduced.

Preferably, in this vehicle seat, the base cloth includes a connecting portion (36) which is deflected toward the internal support member at a fixation position (138) where the skin member is fixed to the internal support member by being pulled toward the internal support member.

Owing to this arrangement, even when the fixation position of the skin member is pulled in the fore and aft direction by the seating of an occupant on the vehicle seat, the deflected connecting portion of the base cloth is allowed to extend in the fore and aft direction so that the fore and aft tensile force applied to the fixation position can be reduced, and the load on the part of the heat wire located on the fixation position can be reduced.

Preferably, this vehicle seat further includes a pressure sensor (120) placed on a part of the front side of the internal support member overlapping with the fixation position of the skin member as seen from a direction orthogonal to the main body of the internal support member.

Since the pressure sensor is positioned so as to overly the fixation position of the skin member which is readily deformable, the pressure sensor is better able to detect the pressure.

Preferably, in this vehicle seat, the internal support member is provided with a clip mounting hole (125, 126) for securing a clip (127), and the base cloth does not cover the clip mounting hole.

Since the base fabric is protected from the pressure which the tip end of the clip, which is inserted from the back side into the clip mounting hole, and may protrude from the front side of the internal support member, may cause, the bending load on the seat heater can be minimized.

Preferably, in this vehicle seat, the main body of the internal support member is provided with a plurality of engagement holes (122, 123) for engaging an edge of the skin member, and the base cloth is placed away from the engagement holes as seen from the direction orthogonal to the main body of the internal support member.

Since the base cloth is placed away from the engagement holes, the assembly worker is able to see the engagement holes so that the assembly work in securing the edge part of the skin member to the internal support member is facilitated.

Preferably, in this vehicle seat, the lateral side edges of the base cloth are located inward of the respective side edges of the internal support member.

Thereby, the range over which the base cloth is supported by the internal support member is maximized so that the bending load on the seat heater can be minimized.

A primary aspect of the present invention provides a vehicle seat provided with tubular portions internally defining a clip mounting hole that facilitates the assembly work in securing clips to the inclined portions of the internal support member.

According to another aspect of the present invention, each tubular portion is provided with a shoulder surface surrounding the clip mounting hole so that the reduction in stiffness due to the clip mounting hole can be compensated for, and the tip end of the clip can be engaged by the shoulder surface so as not to protrude from the front surface of the inclined surface, and prevent impairment of seating comfort.

According to yet another aspect of the present invention, an elongated member extending in the longitudinal direction can be secured to either one of the inclined portions by forming a clip mounting hole in the corresponding inclined portion.

According to yet another aspect of the present invention, each inclined portion is provided with a plurality of mounting holes to allow a plurality of elongated member can be secured to the inclined portion.

According to yet another aspect of the present invention, the mounting holes are arranged laterally without overlapping with each other in front view so that a plurality of elongated members extending in the longitudinal directions can be secured in a laterally spaced apart relationship.

According to yet another aspect of the present invention, the mounting holes are arranged longitudinally without overlapping with each other in side view so that the mounting holes are spaced apart from one another, and the work efficiency can be improved.

According to yet another aspect of the present invention, each inclined portion is provided with a longitudinal end reinforcing portion so that the stiffness of the inclined portion can be appropriately adjusted.

BRIEF DESCRIPTION OF THE DRAWING(S)

FIG. 3 is a fragmentary sectional rear view showing an inclined portion and a cover member;

FIG. 6 is a fragmentary perspective view of the inclined portion (with the cover member omitted from illustration);

FIG. 7 is a rear view of a part of the vehicle seat surrounding the inclined portion;

DESCRIPTION OF THE PREFERRED EMBODIMENT(S)

The vehicle seats 1 according to the preferred embodiments of the present invention are described in the following with reference to the appended drawings. The various directions mentioned in the following disclosure will be based on the view point of an occupant seated on the vehicle seat.

First Embodiment

Figure 1:
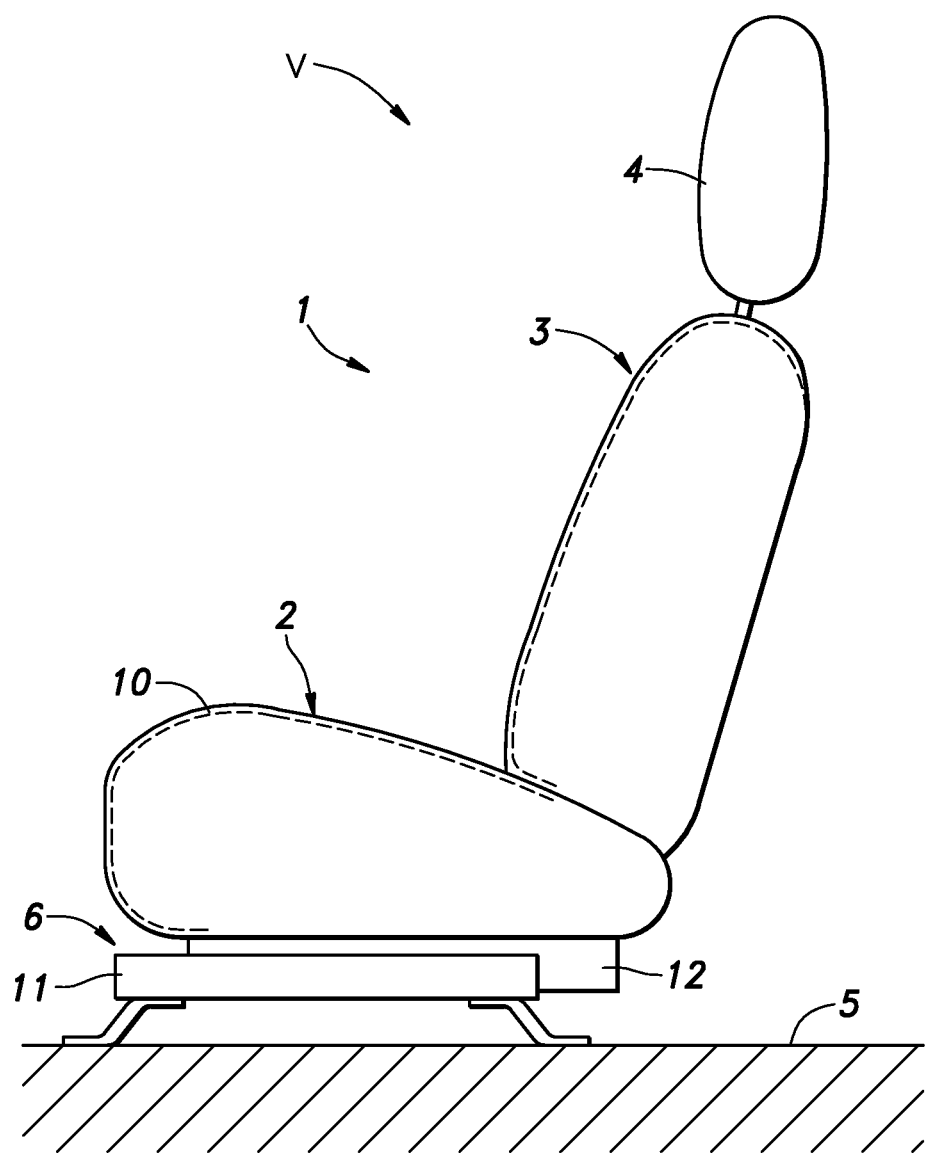
FIG. 1 is a schematic side view of a vehicle seat according to a first embodiment of the present invention.

The vehicle seat 1 of a vehicle V illustrated in FIG. 1 may be used either as a driver's seat or a passenger seat, and includes a seat cushion 2, a seat back 3, and a headrest 4 in a per se known manner. The seat cushion 2 is supported by a floor 5 of a passenger compartment of the vehicle via a pair of slide rails 6. The vehicle seat 1 includes a seat cushion frame 7, a cushion pad 9 made of urethane foam or the like, and placed on the seat cushion frame 7 via an internal support member 8 (FIG. 2), and a skin member 10 covering the cushion pad 9. Each slide rail 6 consists of a lower rail 11 fixed to the floor 5, an upper rail 12 slidably supported by the lower rail 11, and fixed to the seat cushion frame 7 so that the fore and aft position of the vehicle seat 1 may be adjusted, and a rail cover 13 (see FIG. 3) covering at least a part of the upper rail 12.

Figure 2:
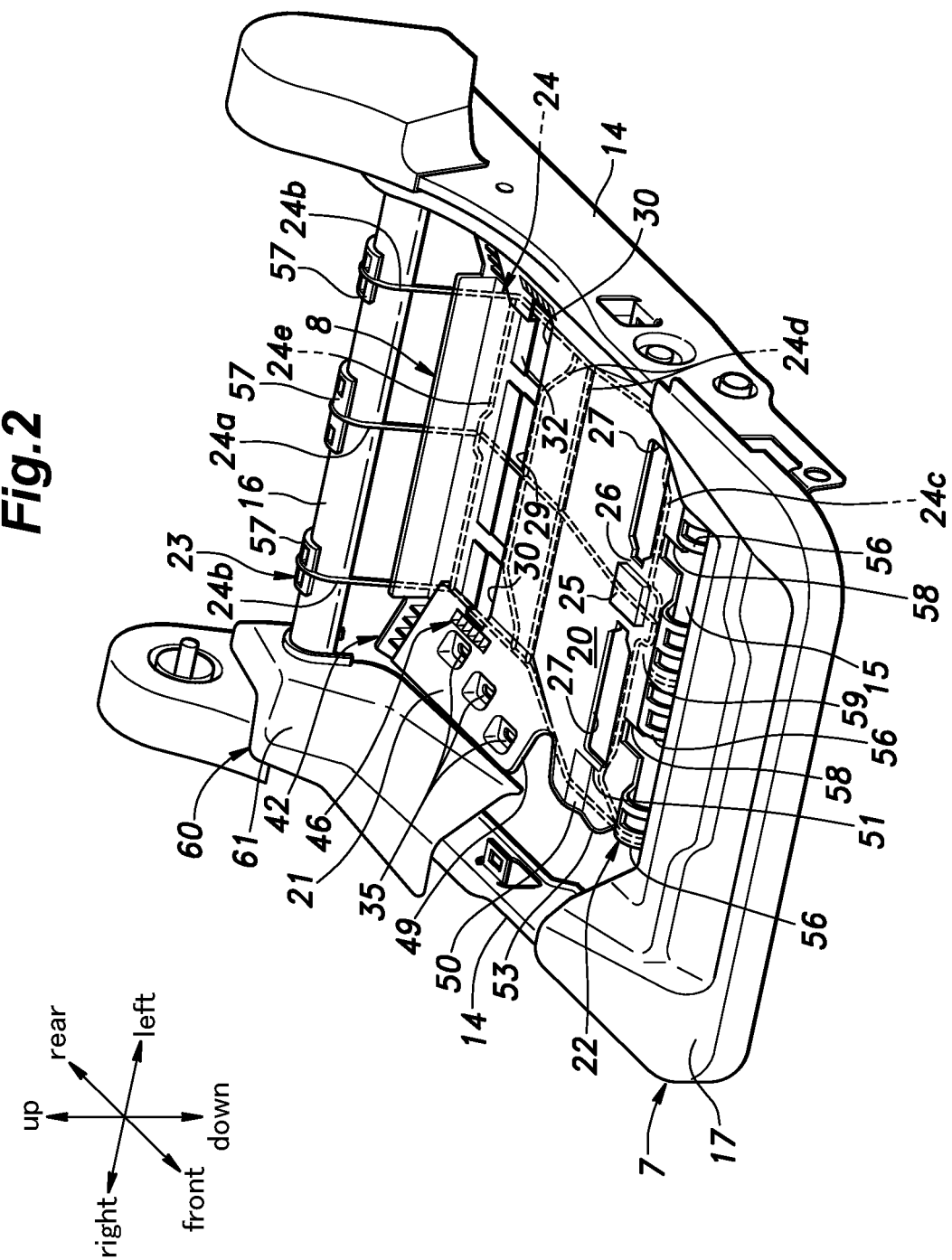
FIG. 2 is a perspective view of a seat cushion frame and an internal support member of a vehicle according to the first embodiment with a pad and a skin member omitted from illustration.

As shown in FIG. 2, the seat cushion 2 includes the seat cushion frame 7 having a rectangular configuration in plan view, and the internal support member 8 which is supported by the seat cushion frame 7 inside the seat cushion frame 7, and resiliently supports the load of the occupant via the skin member 10, and the cushion pad 9.

Figure 4:
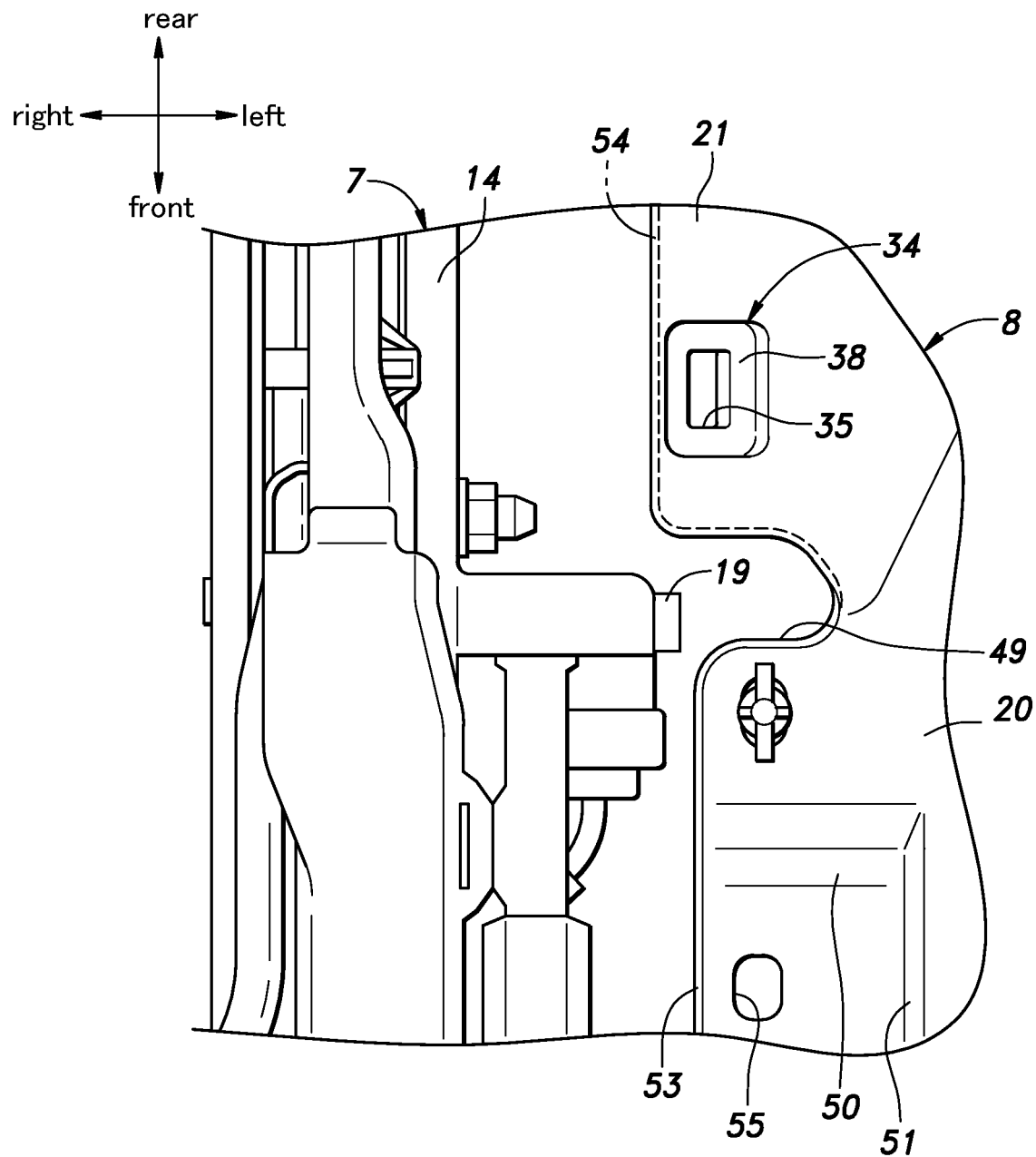
FIG. 4 is a fragmentary plan view of a side part of the internal support member and a side member of a seat frame.

The seat cushion frame 7 includes a pair of side members 14 extending along either side thereof, a front cross member 15 connecting the front ends of the side members 14 to each other, a rear cross member 16 connecting the rear ends of the side members 14 to each other, and a pan frame 17 connected to the front ends of the left and right side members 14, and generally located ahead of the front cross member 15. Each side member 14 consists of a metal member elongated in the fore and aft direction, and having a pair of flanges extending laterally from the upper and the lower edges thereof, respectively. The side members 14 are each supported by the upper rail 12 (see FIG. 3) via a base member 65. The front cross member 15 and the rear cross member 16 each consist of a metal pipe member elongated in the lateral direction. The pan frame 17 consists of a stamp formed sheet metal, and is provided with a contoured surface substantially conforming to the front part of the seating surface. As shown in FIG. 4, the right side member 14 is provided with a position sensor 19 for detecting the fore and aft position of the vehicle seat 1 relative to the floor 5.

As shown in FIG. 2, the internal support member 8 is supported by the seat cushion frame 7 so as to be located within the seat cushion frame 7. The internal support member 8 includes a main body 20 in sheet or plate form extending substantially in parallel with the seat cushion frame 7, a pair of inclined portions 21 extending obliquely upward toward the corresponding lateral outer side edge thereof from either lateral edge of a rear portion of the main body 20, a front mounting portion 22 extending forward from a front edge of the main body 20 and secured to the front cross member 15, and a rear mounting portion 23 extending rearward from a rear edge of the main body 20, and secured to the rear cross member 16. The part of the main body 20 which is located ahead of a middle point of the rear portion with respect to the longitudinal direction may be slightly inclined upward toward the front end of the main body 20. The internal support member 8 is formed by a plastic sheet material, and is provided with wires 24 insert molded in the plastic sheet material so as to resiliently support the seat occupant by deflecting under the load of the seat occupant.

The vehicle seat 1 is fitted with a seat belt reminder (SBR) system that issues a warning when the seat occupant is seated on the vehicle seat 1 without wearing the seat belt, and is therefore provided with a pressure sensor 25. A sensor mounting portion 26 for supporting the pressure sensor 25 is provided on the upper surface of a laterally middle part of the front portion 50 of the main body 20. The pressure sensor 25 detects the pressure on the seat cushion 2 to determine the presence of a seat occupant seated on the vehicle seat 1. The laterally middle part of the rear portion of the main body 20 receives a relatively small pressure from the seated occupant because the pressure of the occupant is diverted to the inclined portions 21. To avoid the influences of the diversion of the pressure by the inclined portions 21, the pressure sensor 25 is placed so as to be offset from the inclined portions 21 in the forward direction. Thereby, the accuracy of a seating determination unit typically consisting of ECU in determining the presence of a seat occupant from the signal of the pressure sensor 25 can be improved.

The vehicle seat 1 (see FIG. 1) is fitted with an air ventilation system that improves the seating comfort by drawing or blowing air into or out of the surface of the vehicle seat 1 so as to control humidity. A pair of air openings 27 are formed on either side of the sensor mounting portion 26 of the main body 20 to provide passages for the air. Each air opening 27 is rectangular in shape in plan view, and central longitudinal wire 24a extending in the longitudinal direction is buried in the plastic material forming the sensor mounting portion 26 interposed between the two air openings 27.

The rear portion of the main body 20 is provided with a central engagement hole 29 located in a laterally central position and a pair of outer engagement holes 30 located on either side of the central engagement hole 29, which are passed through the main body 20 to engage a plurality of hooks 28 (see FIG. 5) attached to the edge of the skin member 10 and to adjust the deflection of the support member 8. The central engagement hole 29 and the outer engagement holes 30 are each rectangular in shape in plan view. The central engagement hole 29 and the outer engagement holes 30 that are thus arranged in the lateral direction have a same longitudinal length, but the central engagement hole 29 has a larger lateral width than the outer engagement holes 30. As a result, the central part of the internal support member 8 is relatively flexible so that a soft seating feel can be achieved. By thus differentiating the longitudinal lengths of the central engagement hole 29 and the outer engagement holes 30, the flexibility of the internal support member 8 can be controlled so as to provide an optimum seating comfort. Since the central longitudinal wire 24 passes centrally through the central engagement hole 29, the part of the internal support member 8 surrounding the central engagement hole 29 can be reinforced.

Figure 5C:
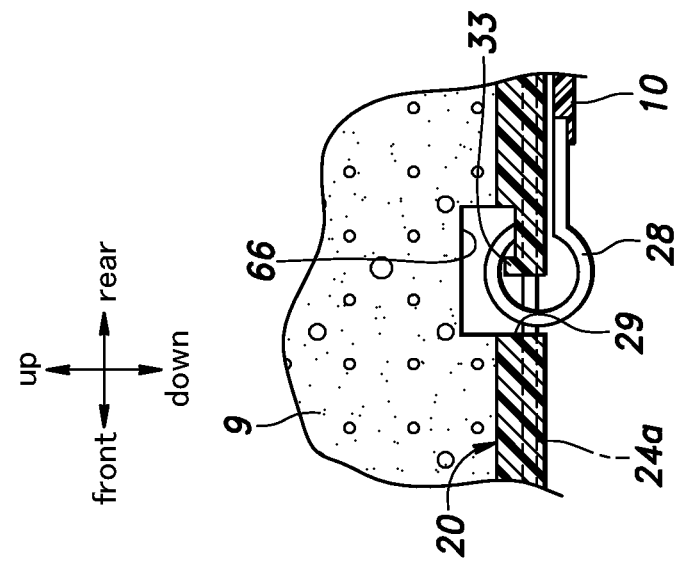
FIG. 5C is a view similar to FIG. 5B showing a modification of the first embodiment.
Figure 5B:
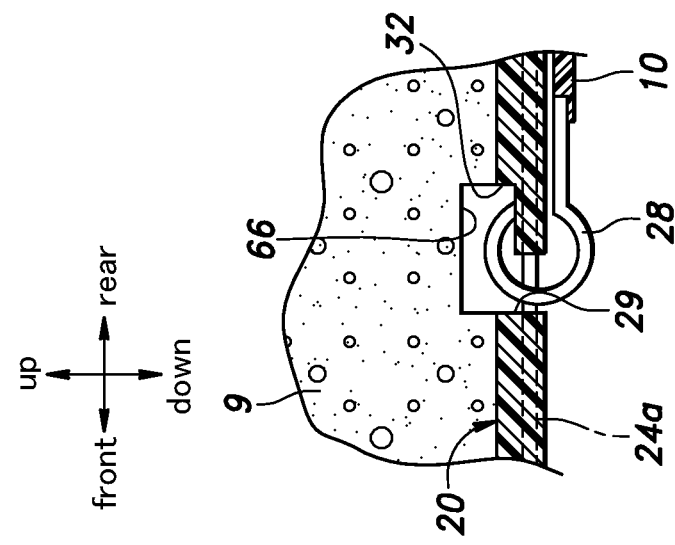
FIG. 5B is a fragmentary sectional view of the arrangement for engaging an edge of a skin member to the internal support member.
Figure 5A:
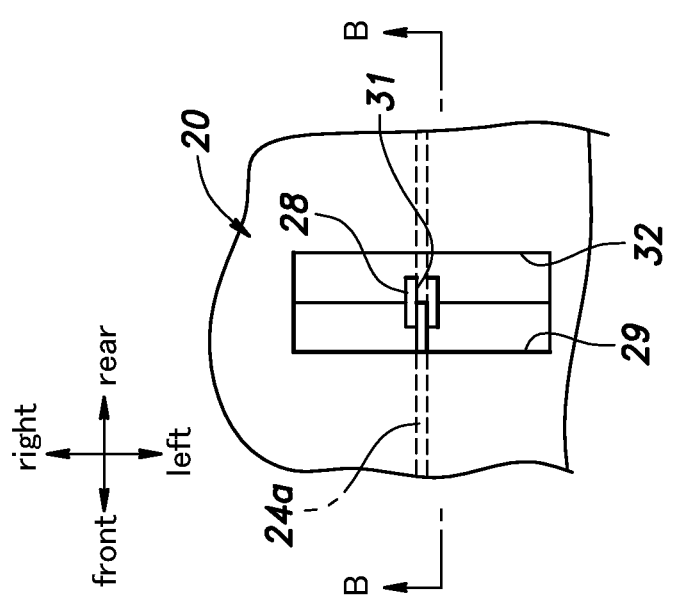
FIG. 5A is a fragmentary plan view of an arrangement for engaging an edge of a skin member to the internal support member.
Figure 8:
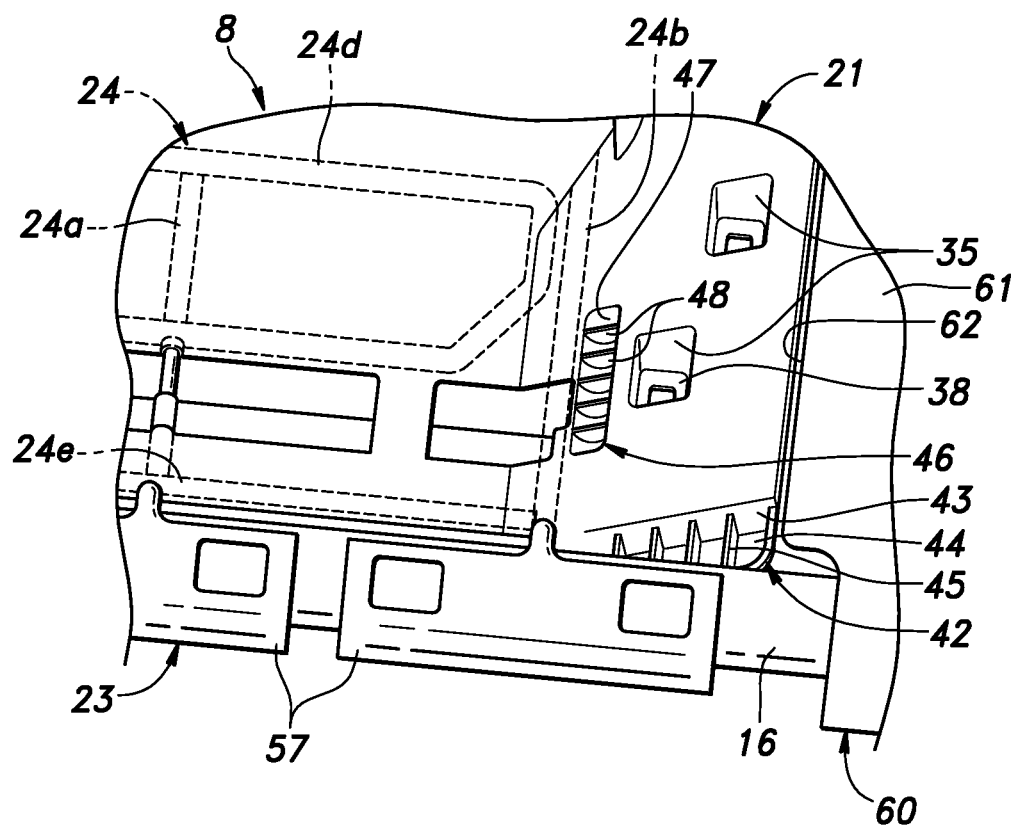
FIG. 8 is a fragmentary perspective view of the seat frame and the internal support member.

As shown in FIG. 5A, the hook 28 engaged by the central engagement hole 29 is provided with a slot 31 for receiving the central longitudinal wire 24 so that the engagement strength of the hook 28 in engaging the central engagement hole 29 is increased. Owing to the presence of the slot 31, the hook 28 to be engaged by the central engagement hole 29 is different in shape and wider as compared to the hooks 28 to be engaged by the outer engagement holes 30. By thus varying the shape and the width of the hooks 28 depending on which of the engagement holes the hooks are to be engaged by, the worker is prevented from engaging the hook 28 on wrong engagement holes. Since the central engagement hole 29 and the outer engagement holes 30 are spaced from the rear mounting portion 23, the work efficiency is increased. Since the skin member 10 can be engaged by the internal support member 8, the seat cushion frame 7 is not required to be provided with projecting pieces as engagement portions for the purpose of attaching the skin member 10 to the seat cushion frame 7, the size and weight of the seat cushion frame 7 can be minimized.

As shown in FIGS. 2 and 5, a hook recess 32 is provided on the upper side of the rear edge of each of the central engagement hole 29 and the outer engagement holes 30. Each hook 28 is thus passed upward through the corresponding central engagement hole 29 or the outer engagement hole 30, and received by the corresponding hook recess 32 at tip end of the hook 28. By thus receiving each hook 28 in the corresponding hook recess 32, the hook 28 can be positioned relative to the corresponding central engagement hole 29 or the outer engagement hole 30.

Alternatively or additionally to the hook recess 32, a hook edge wall 33 may be provided on the upper surface of the rear edge of the central engagement hole 29 to engage the tip end of the corresponding hook 28. (The same arrangement may also be made to each outer engagement hole 30.) By engaging the tip ends of the hooks 28 with the corresponding hook edge walls 33, the hooks 28 are prevented from being inadvertently dislodged from the central engagement hole 29 and the outer engagement holes 30. Since the central engagement hole 29 and the outer engagement holes 30 are aligned with the inclined portions 21 of the main body 20 or the parts of the main body 20 having a relatively high stiffness in side view, the central engagement hole 29 and the outer engagement holes 30 are prevented from deforming so that the hooks 28 can be prevented from being dislodged from the central engagement hole 29 and the outer engagement holes 30 in a reliable manner.

As shown in FIGS. 2, 3 and 6 to 8, each inclined portion 21 is formed with a plurality of tubular portions 34 projecting downward (in the orthogonal direction relative to the main body 20). The inner bore of each tubular portion 34 defines a mounting hole 35 for receiving a clip 37 for retaining another member to the internal support member 21. The inner circumferential surface of the tubular portion 34 is provided with a shoulder surface 38 for engaging the tip end of the clip 37 as well as for increasing the stiffness of the tubular portion 34. For instance, the tubular portion 34 includes a bottom wall 34a which is rectangular in shape in plan view and formed with a through hole for passing through the clip 34, and a side wall 34b extending upward from the periphery of the bottom wall 34a. The upper surface of the bottom wall 34a provides the shoulder surface 38.

The lower end of the tubular portion 34 is positioned on the same horizontal plane as the lower surface of the main body 20. Since the mounting hole 35 extends orthogonally to the main body, the assembly work in securing the clip 37 to the inclined portion 21 from the back side (lower side) thereof is facilitated, and can be performed in a similar fashion as with the main body 20 because the mounting hole 35 extends orthogonally to the main body 20. More specifically, the clip 37 is not required to be inserted at an angle to the tubular portion 34. Owing to the shoulder surface 38, the tip end of the clip 37 does not protrude from the upper surface of the inclined portion 21 so that the clip 37 is prevented from adversely affecting the seating comfort of the vehicle seat 1.

Although not shown in the drawings, the central engagement hole 29 and the outer engagement holes 30 are offset from the fixation position 10a or the listing engagement position of the skin member 10 in the longitudinal direction. When the skin member 10 is secured also to each side member 14, the securing position are offset from the inclined portions 21 in the longitudinal direction. Each inclined portion 21 may be provided with a plurality of mounting holes 35 so that a plurality of elongated member 36 may be secured to the inclined portion 21. In such a case, the mounting holes may be offset from each other both in the longitudinal direction and the lateral direction so that the work efficiency of the assembly work may be improved.

The back side of each inclined portion is provided with a grid reinforcement portion 39 which includes a plurality of longitudinal ribs 40 projecting downward and extending in the longitudinally along the inclined portions 21, and a plurality of lateral ribs 41 projecting downward and extending laterally along the inclined portions 21. The grid reinforcement portion 39 creases the stiffness of the inclined portions 21 so that the deformation of the inclined portions 21 can be reduced, and additionally stabilizes the position of the internal support member 8 relative to the seat cushion frame 7. The tubular portions 34 may be placed in the grid reinforcement portion 39 so that a part of longitudinal ribs 40 and/or the lateral ribs 41 are connected to the tubular portions 34 so that the decrease in the stiffness of the inclined portions 21 due to the presence of the mounting hole 35 in each tubular portion 34 may be made up for.

The rear edge of each inclined portion is provided with a rear part reinforcing portion 42 to reinforce the inclined portion 21 and adjust the deflection of the inclined portion 21. The rear part reinforcing portion 42 includes an upright wall 43 extending substantially perpendicularly from a rear end of the inclined portion 21 toward a back side of the inclined portion 21, a bottom wall 44 extending from a free end of the upright wall 43 in the rearward or obliquely rearward and upward, and a plurality of reinforcing walls 45 (ribs) fixedly connected to the upright wall 43 and the bottom wall 44 substantially in an orthogonal relationship. To compensate for the reduction in stiffness owing to the presence of the mounting holes 35, a part of the reinforcing walls 45 are located on longitudinal extension lines of the mounting holes 35, and at a same elevation as the mounting holes 35. The longitudinal ribs 40 of the grid reinforcement portion 39 may be connected to the upright wall 43 so as to cross the same so that the longitudinal ribs 40 and the upright wall 43 increase the stiffness of the inclined portion against load inputs directed in various directions.

A connecting part between the main body 20 and each inclined portion 21 located ahead of the rear part reinforcing portion 42 is provided with a connecting part reinforcing portion 46 for reinforcing the connection between the main body 20 and the inclined portion 21. The rear part reinforcing portion 42 includes a connecting recess 47 formed on an upper surface of a connecting part between the main body 20 and the inclined portion 21 and elongated in the longitudinal direction, and a plurality of connecting ribs 48 provided inside the connecting recess 47 and each having a major plane extending orthogonally to the longitudinal direction. By adjusting the length and depth of the connecting recess 47, and the number and the thickness of the connecting ribs 48, the deflection of the inclined portion 21 and the stiffness of the connecting part between the main body 20 and the inclined portion 21 can be adjusted. The reinforcing recess 47 is provided in a part of the inclined portion 21 located on a lateral side of one of the mounting holes 35, and preferably has a greater longitudinal length than the mounting hole 35. Thereby, the connecting ribs 48 are able to reinforce a large part of the inclined portion 21 whose mechanical strength could be reduced owing to the presence of the mounting hole 35.

The connecting ribs 48 are located laterally more inward than the reinforcing walls 45. The outer longitudinal wire 24b is buried in the part of the internal support member 8 located between the main body 20 and the inclined portion 21 so as to reinforce the connecting part between the main body 20 and the inclined portion 21. The wire 24 may also be arranged around the tubular portion 34 or the connecting part reinforcing portion 46 to increase the stiffness of the inclined portion 21. In such case, the wire 24 is preferably arranged so as to cross the longitudinal ribs 40 and the lateral ribs 41, and for further improvement in stiffness, the elongated member 36 may extend along a part of the wires 24 (although not shown in the drawings).

As shown in FIG. 4, a side notch 49 is formed on each side edge of the internal support member 8 so as to separate the main body 20 and the corresponding inclined portion 21 located in the rear portion of the internal support member 8. A position sensor 19 is mounted to a part of the side member 14 which substantially coincides with the side notch 49 in terms of the longitudinal positioning. The presence of the side notches 49 reduces the size and weight of the internal support member 8, and allows the mounted state of the position sensor 19 to be inspected. The side notch 49 may be provided only on the side of the internal support member 8 where the position sensor 19 is provided. The seat cushion frame 7 and the support member 8 are substantially mirror symmetric with respect to the longitudinal center line except for that the position sensor 19 is provided only on one side the seat cushion frame 7.

As there is no inclined portion 21 ahead of the side notches 49, the side edges of the main body 20 are the edges of the internal support member 8 in this region. Each laterally outer part 50 of the front portion of the main body 20 is formed with a crank portion 50a in which the front part thereof is lower than the rear part thereof in side view so that the reduction in stiffness caused by the creation of the side notches 49 is made up for. Since the front part of the crank portion 50a is lower than the rear part thereof, the impact of the crank portion 50a on the legs of the occupant is minimal. When another member is attached to the back side of the lower part of the crank portion 50a, the tip end of the clip (not shown in the drawings) which projects upward from the surface of the lower part of the crank portion 50a is prevented from adversely affecting seating comfort on account of the elevated rear part of the crank portion 50a. Even though the front part of the crank portion 50a is lowered, since the buttocks of the occupant are supported by the rear part of the crank portion 50a, the influences of the crank portion 50a on the capability of the internal support member 8 to support the buttocks of the occupant is very slight.

The part of the internal support member 8 located laterally outward of each air opening 27 is provided with a bent portion 51 which has a bent shape in front view so as to be connected to the lowered part of the corresponding crank portion 50a in the laterally outer part of the front portion 50 of the main body 20. The bent portion 51 extends from a part adjoining the air opening 27 to a part adjoining the front edge of the main body 20. The bent portions 51 make up for the reduction in the stiffness of the main body 20 by the air openings 27.

As shown in FIGS. 3 and 4, each side edge of the front portion 50 of the main body 20 is provided with a flange 53 that projects upward for increasing the stiffness of the side edge of the internal support member 8, and the side edge of each inclined portion 21 is provided with a flange 54 that projects downward.

When a clip (not shown in the drawings) is inserted into a hole 55 formed in a part of the main body 20 adjoining the side edge of the front portion of the main body 20, the tip end of the clip projects upward from the main body 20. The upwardly projecting flange 53 mitigates the influences of the projecting tip end of the clip on the seating comfort. Meanwhile, since the mounting holes 35 of each inclined portion 21 are each provided with the shoulder surface 38, the tip end of the clip 37 inserted into the mounting hole 35 does not project upward from the inclined portion 21. Therefore, the flange 54 of each inclined portion 21 projects downward so as not to affect the seating comfort.

As shown in FIG. 2, the wires 24 buried in the plastic material forming the internal support member 8 include those extending in the lateral direction, and these wires increase the stiffness of the surrounding parts of the internal support member 8. The front lateral wire 24c is positioned along the front edges of the air openings 27, and the central lateral wire 24d is positioned between the air openings 27 and the engagement holes (the central engagement hole 29 and the outer engagement holes 30), and the rear lateral wire 24e is positioned along a part adjacent to the rear edge of the main body 20 or behind the central engagement hole 29 and the outer engagement holes 30. A part of the central lateral wire 24d extends along the front edges of the central engagement hole 29 and the outer engagement holes 30. The central lateral wire 24d may include a plurality of central wires 24, and in this case, a part of the central lateral wires 24 may be formed by a part of wires 24 arranged in an annular fashion.

The front mounting portion 22 is engaged by the front cross member 15 from above, and includes three front mounting pieces 56 which are separated from each other for the convenience of handling. Similarly, the rear mounting portion 23 is engaged by the rear cross member 16 from above, and includes three rear mounting pieces 57 which are separated from each other for the convenience of handling. The end portions of the central longitudinal wire 24a and the outer longitudinal wires 24b are buried in the corresponding front mounting pieces 56 and the corresponding rear mounting pieces 57 to reinforce the front mounting pieces 56 and the rear mounting pieces 57.

Parts of the front edge of the main body 20 where the front mounting pieces 56 are absent are each provided with a front notch 58. The lateral width of each front notch 58 is smaller than the distance between the adjacent front mounting pieces 56. Thus, the space defined by the front edge of the main body 20 and each adjoining pair of front mounting pieces 56 is indented in plan view. Owing to the presence of the front notches 58, the deflection stroke of the part ranging from the front edge of the main body 20 and the front mounting pieces 56 can be increased so that the mounting of the front mounting pieces 56 to the front cross member 15 can be facilitated. Since the lateral width of each front notch 58 is smaller than the distance between the adjacent front mounting pieces 56, the presence of the front notches 58 does not impair the seating comfort.

The part of the main body 20 located between the sensor mounting portion 26 and the central front mounting piece 56 forms a connecting portion 59 in which the central longitudinal wire 24a is buried. Owing to the presence of the air openings 27 and the front notches 58, the stiffness of the laterally central part of the front portion 50 of the main body 20 is reduced, but the connecting portion 59 ensures an adequate stiffness in this region. Each front mounting piece 56 is formed as a hook extending in a substantially forward direction, and each rear mounting piece 57 is formed as a hook extending in an oblique upward and rearward direction from the rear edge of the main body 20.

The front lateral wire 24c is bent so as to extend along the front edge of the main body 20, and avoid the front notches 58. The lateral end parts of the front lateral wire 24c extend forward, and laterally outward of the bent portions 51 along the flanges 53 so that the front corners of the main body 20 are reinforced without increasing the size of the internal support member 8.

As shown in FIGS. 2 and 3, each side member 14 of the seat cushion frame 7 is fitted with a cover member 60. The cover member 60 covers a rear part of the corresponding side member 14 from a laterally inner side and above. The cover member 60 is made of a plastic material. The cover member 60 is provided with a side wall 61 that forms the laterally inner side thereof, and a lower part of the side wall 61 inclines in the inward direction toward the lower end thereof. A side edge of the inclined portion 21 abuts against the surface of the side wall 61. To reduce the friction between the side edge of the inclined portion 21 and the side wall 61, and facilitate the assembly work, the part of the surface of the side wall 61 with which the side edge of the inclined portion 21 comes into contact is formed as a planar portion 62. The side edge of the inclined portion 21 is rounded in front view. The front end and the rear end of the side wall 61 are preferably located in front of and behind the front end and the rear end of the side edge of the inclined portion, respectively. To minimize the rubbing between the inclined portion 21 and the side wall 61, the side wall 61 has a smaller thickness than the inclined portion 21. By causing the side edge of the inclined portion 21 to abut against the surface of the side wall 61 of the cover member 60, the internal support member 8 can be positioned laterally relative to the frame 7. In addition, after completion of the assembly work, the internal support member 8 is prevented moving in the lateral direction relative to the frame 7. Since the inclined portion 21 and the cover member 60 on the left hand side is a mirror image of the inclined portion 21 and the cover member 60 on the right hand side, the assembling the internal support member 8 to the frame 7 is facilitated.

The side wall 61 is provided with a boss 63 that projects from the back surface thereof, and abuts against the side member 14 at the free end thereof. A part of the side member 14 adjacent to the free end of the boss 63 is provided with a mounting hole 14a for securing a clip (not shown in the drawings) that retains an elongated member 36. Even when a load is applied to the cover member 60 from the inclined portion 21, since the boss 63 restricts the deformation of the side wall 61 of the cover member 60, the elongated member 36 is prevented from being inadvertently dislodged under the loading from the side wall 61. In order for the elongated member 36 to be placed so as to avoid the rear cross member 16, the side member 14 may be provided with a bracket for supporting the elongated member 36. A cover reinforcing portion 64 is formed by a rib which is connected between the inner surface of the side wall 61 and the boss 63. The rib forming the cover reinforcing portion 64 has a major plane which is orthogonal to the longitudinal direction, and abuts against the side member 14 at the outer lateral end thereof. The stiffness of the cover member 60 is increased by the boss 63 and the cover reinforcing portion 64 so that the deformation of the cover member 60 can be avoided, and the position of the internal support member 8 relative to the frame 7 can be stabilized.

A part of the lateral ribs 41 of the inclined portion 21, and the rib of the cover reinforcing portion 64 are preferably located along a common line. In such case, since the part reinforced by the lateral ribs 41 and the rib forming the cover reinforcing portion 64 are laterally aligned with each other, the deformation of the internal support member 8 and the cover member 60 can be minimized. For improved stiffness, one of the tubular portions 34 and the boss 63 preferable align each other in side view. A part of the lateral ribs 41 of the inclined portion 21, and the rib of the cover reinforcing portion 64 may also not be located along a common line. In such a case, the inclined portion 21 and the cover member 60 can be made more deformable so that the seating comfort may be improved.

In the longitudinal range over which the inclined portion 21 is in contact with the cover member 60, the lower end of the cover member 60 is supported by the rail cover 13 by being in contact with the laterally inner side of the rail cover 13. Since the rail cover 13 is supported by the upper rail 12, the side member 14 is thus supported by the upper rail 12 via the base member 65. Thereby, the deformation of the cover member 60 is minimized, and the position of the internal support member 8 relative to the seat cushion frame 7 can be stabilized. The part of the cover member 60 at which the side edge of the inclined portion 21 is in contact with is located between the boss 63 that is in contact with the side member 14 and the lower end of the cover member 60 supported by the rail cover 13 in terms of vertical positioning. For the improvement of mounting stability, the side member 14 is positioned on an extension plane of the surface of the inclined portion 21.

Figure 9:
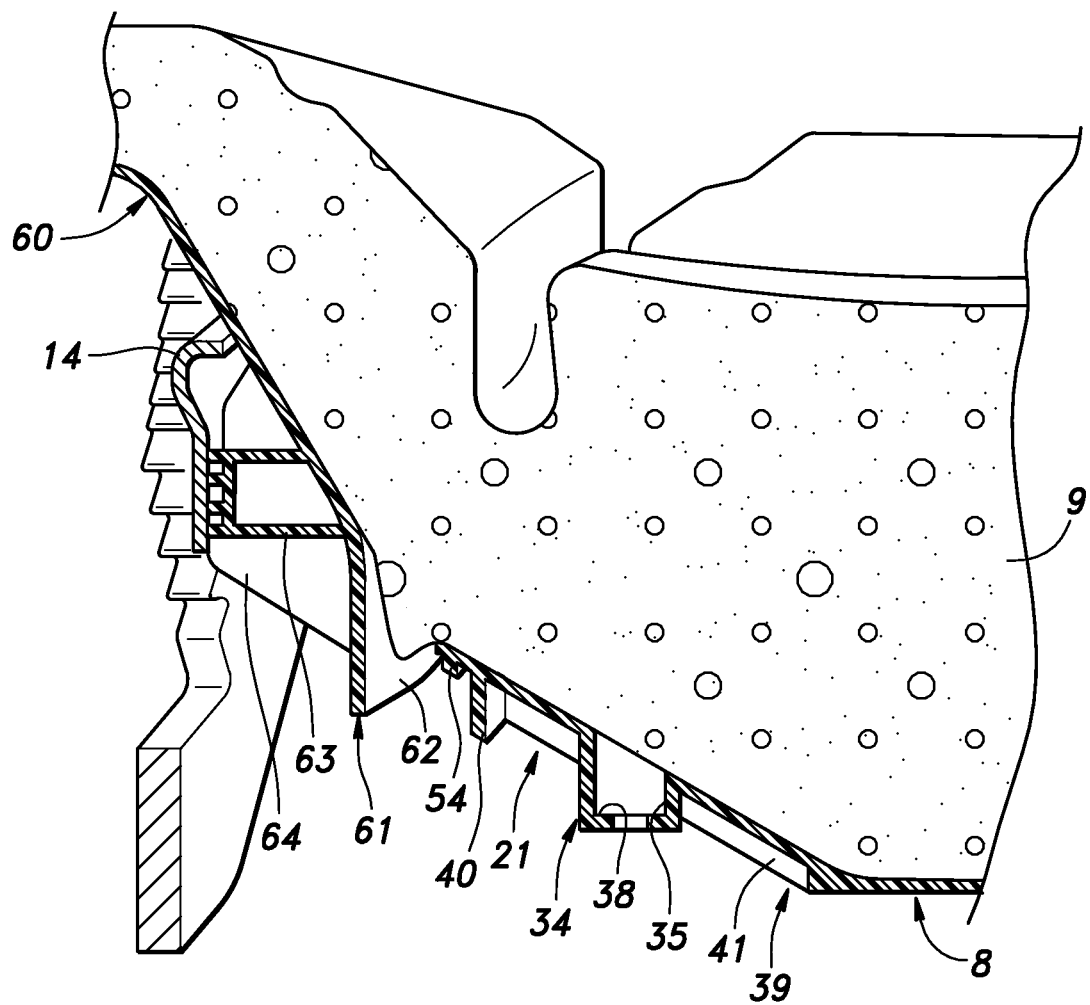
FIG. 9 is a sectional front view showing the inclined portion and the cover member as well as the pad.

As shown in FIG. 9, the surface of the inclined portion 21 is in contact with the pad 9, and a part of the pad 9 is fitted into the gap between the cover member 60 and the inclined portion 21. As a result, the side edge of the inclined portion 21 abuts against the cover member 60 via the pad 9. Owing to the part of the pad 9 that is fitted into the gap between the cover member 60 and the inclined portion 21, the friction between the inclined portion 21 and the cover member 60 can be minimized, and friction noise can be minimized. The lateral side edge of the pad 9 is located on the cover member 60, or laterally outward of the side edge of the inclined portion 21. Therefore, the necessary lateral width of the internal support member 8 can be reduced. When the flexibility of the inclined portion 21 is desired to be increased, the side edge of the inclined portion 21 may be spaced from the cover member 60, for instance, by curving the surface of the pad 9 opposing the surface of the inclined portion 21, so that the pad 9 is prevented from intruding into the gap between the cover member 60 and the inclined portion 21.

The pad 9 is preferably placed on the front mounting pieces 56 (see FIG. 2) as well. In such a case, since the loading of the occupant is transmitted to the front mounting pieces 56 via the pad 9, the engagement strength of the front mounting pieces 56 which are hooked or wrapped around the front cross member 15 (see FIG. 2) from above can be increased.

As shown in FIGS. 5B and 5C, the part of the pad 9 opposing each hook 28 is formed with a hook receiving portion 66 which is recessed upward. The hook receiving portion 66 prevents interference between the pad 9 and the hook 28 so that the assembly work in mounting the hooks 28 to the central engagement hole 29 and the outer engagement holes 30 is facilitated. In order to prevent the dislodging of the hooks 28, the part of the pad 9 opposing each hook 28 may be configured to be pressed onto the hook 28, instead of being formed with a hook receiving portion 66.

Figure 10:
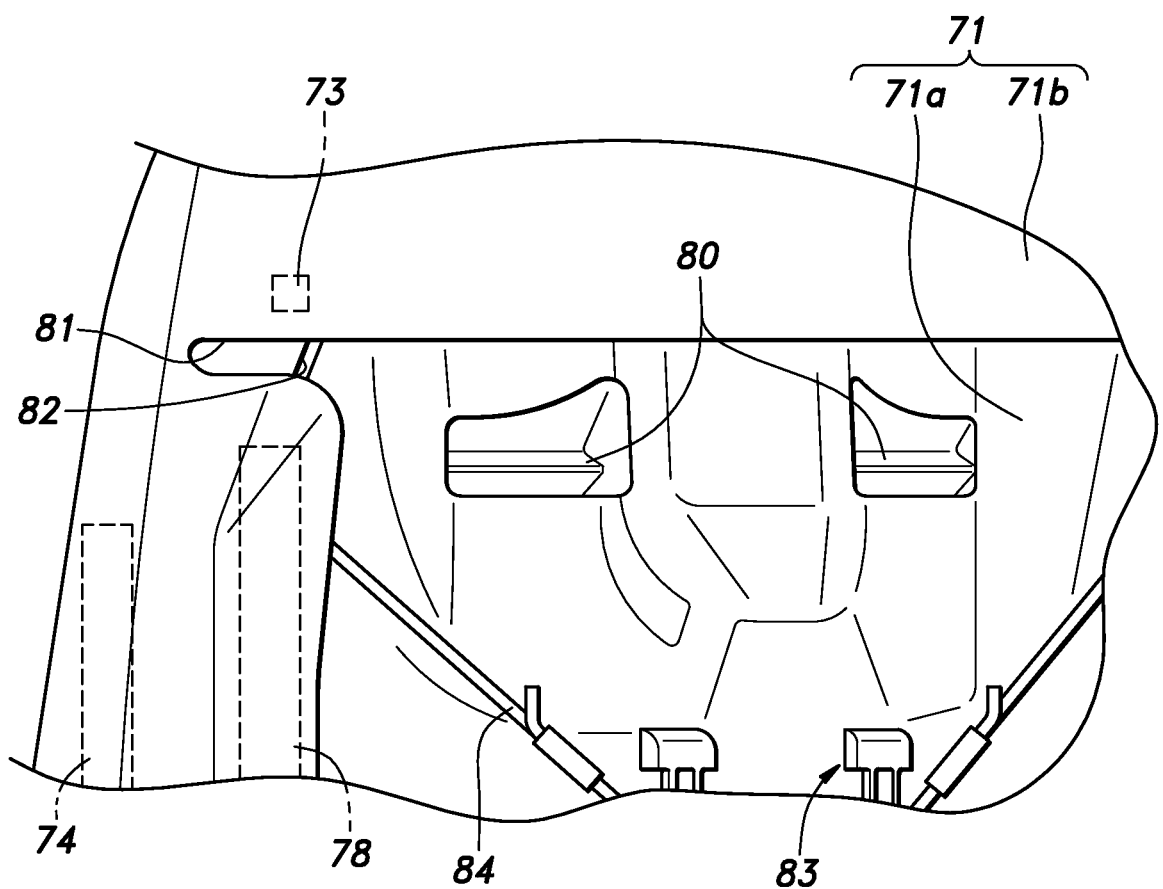
FIG. 10 is a rear view of a pad of a seat back.
Figure 11:
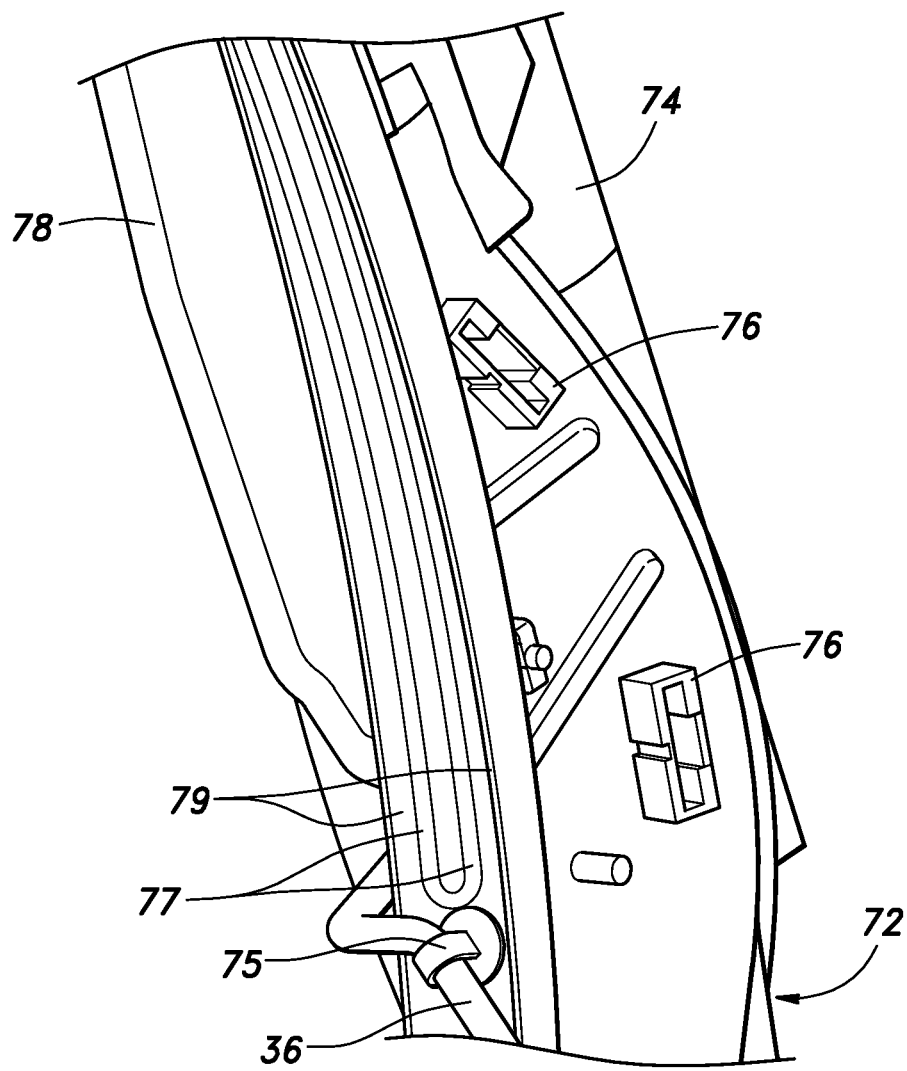
FIG. 11 is a perspective view of a side member of the seat back as seen from an inner front position.

FIG. 10 is a rear view of the pad 71 of the seat back 3 (see FIG. 1), and FIG. 11 is a perspective view of a side member 72 of the seat back 3 as seen from an inner front side. Those of the skin member securing members 73 for securing the skin member 10 (see FIG. 1) that are positioned in an upper end part of the skin member 10 are fixed in positions located higher than the airbag 74 which is mounted to the side member 72. A mounting position 75 for securing the elongated member 36 is preferably spaced from a stay cloth clip mounting position 76 for an airbag 74.

When the elongated member 36 is to be placed on the front side of the side member 72, the pad 71 is preferably placed between the elongated member 36 and the skin member securing member 73 to prevent the skin member securing member 73 from being inadvertently dislodged.

For an increased stiffness, the skin member securing member 73 is preferably provided in positions where the side member 72 and the lower member (not shown in the drawings) overlap with each other or are welded to each other. When securing the elongated member 36 to the side member 72, for an increased stiffness, the mounting position 75 of the elongated member 36 is preferably placed adjacent to a bead 77 that opposes the airbag 74 and avoid a module holder 78. For an increased stiffness, the mounting position of the airbag 74 is preferably on an extension line of the bead 77. For an improved work efficiency, the mounting position for the module holder 78 is positioned so as to avoid a flange 79 of the side member 72 in side view.

The pad 71 includes a main portion 71a located on the front side, and an end portion 71b located on the back side so as to overlap with the upper part and the side parts of the main portion 71a, and covering an upper member (not shown in the drawings) and the side members 72 in cooperation with the main portion 71a. The main portion 71a is provided with a fixation hole 80 for securing the skin member 10 (see FIG. 1) by pulling toward the back side. The end portion 71b is provided with a cutout 81 extending outward in a junction part between the upper part and each lateral part of the end portion 71b. A through hole 82 provided in each side part of the main portion 71a is located on a same plane as the module holder 78 mounted to the side member 72. The through hole 82 is positioned so as to avoid the wire 84 that retains the internal support member 83.

Second Embodiment

A vehicle seat 101 according to a second embodiment of the present invention is described in the following with reference to FIGS. 12 to 15.

Figure 12:
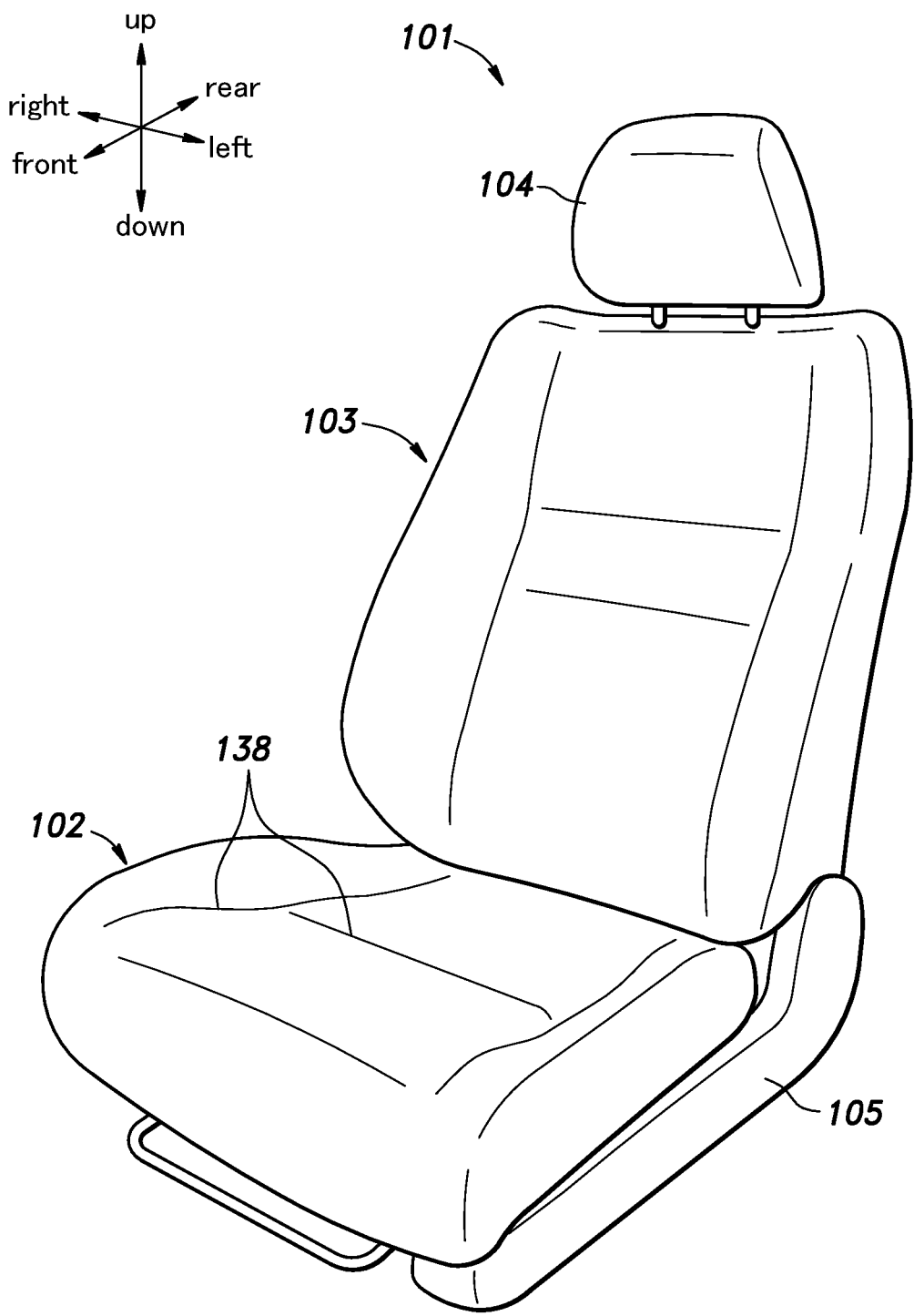
FIG. 12 is a perspective view of a vehicle seat according to a second embodiment of the present invention.

As shown in FIG. 12, the vehicle seat 101 of a vehicle V (see FIG. 1) may be used either as a driver's seat or a passenger seat, and includes a seat cushion 102, a seat back 103, and a headrest 104. The seat cushion 102 is supported by a floor 105 of a passenger compartment of the vehicle via a pair of slide rails 6 (see FIG. 1). The vehicle seat 101 includes a seat cushion frame 106, an internal support member 107 supported by and within the seat cushion frame 106, a cushion pad 108 made of urethane foam or the like, and placed on the seat cushion frame 106 and the internal support member 107, a skin member 109 covering the cushion pad 108, and a seat heater 110 placed between the cushion pad 108 and the skin member 109. The internal support member 107 resiliently supports the loading of the occupant who is seated on the seat 101 via the skin member 109, the seat heater 110, and the seat cushion pad 108.

The seat cushion frame 106 includes a pair of side members 111 extending along either side thereof, a front cross member 112 connecting the front ends of the side members 111 to each other, a rear cross member 113 connecting the rear ends of the side members 111 to each other, and a pan frame 114 connected to the front ends of the left and right side members 111, and generally located ahead of the front cross member 112. Each side member 111 consists of a metal channel member elongated in the fore and aft direction, and having a pair of flanges extending laterally from the upper and the lower edges thereof, respectively. The front cross member 112 and the rear cross member 113 each consist of a metal pipe member elongated in the lateral direction. The pan frame 114 consists of a stamp formed sheet metal, and is provided with a contoured surface substantially conforming to the front part of the seating surface.

Figure 13:
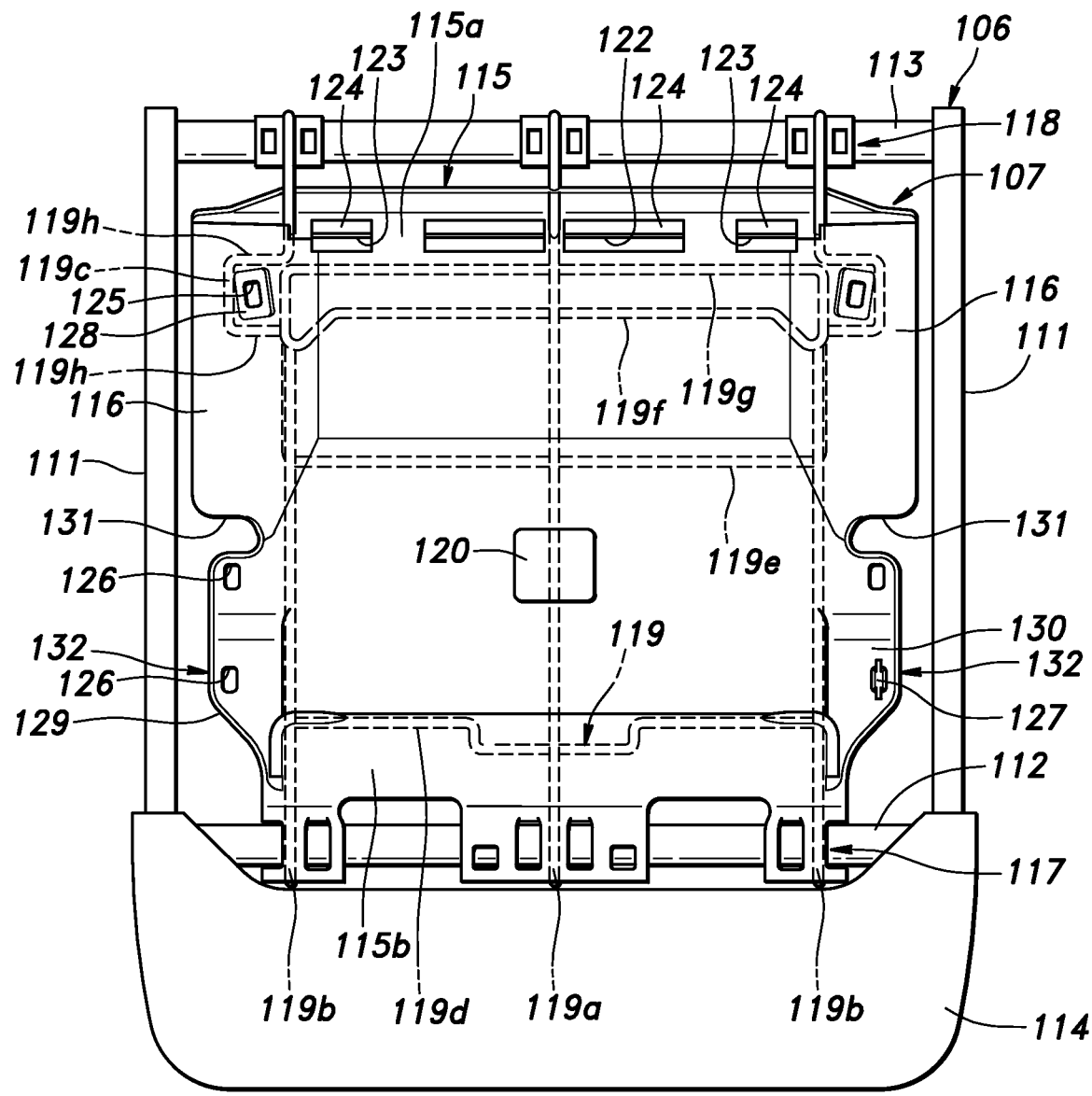
FIG. 13 is a plan view of an internal support member with a pad and a skin member omitted from illustration.

As shown in FIG. 13, the internal support member 107 includes a main body 115 in sheet or plate form extending substantially horizontally, a pair of inclined portions 116 extending obliquely upward toward the corresponding lateral outer side edge thereof from either lateral edge of a rear portion 115a of the main body 115, a front mounting portion 117 extending forward from a front edge of the main body 115 and secured to the front cross member 112, and a rear mounting portion 118 extending rearward from a rear edge of the main body 115 with an upward slant, and secured to the rear cross member 113.

The part of the main body 115 which is located ahead of a middle point of the rear portion 120a with respect to the longitudinal direction is slightly inclined upward toward the front end of the main body 115. The internal support member 107 is formed by a plastic sheet material, and is provided with metal wires 124 insert molded in the plastic sheet material thereof so that the main body 115 can deform in a resilient manner under the loading of the occupant to resilient support the occupant.

The front mounting portion 117 consists of three front mounting pieces 122 (a central front mounting piece 122a and a pair of outer front mounting pieces 122b) which are located at a laterally central part and either side end part of the front edge of the main body 115, respectively, and engages the front cross member 115 from above. The rear mounting portion 118 also consists of three rear mounting pieces 123 (a central rear mounting piece 123a and a pair of outer rear mounting pieces 123b) which are located at a laterally central part and either side end part of the rear edge of the main body 115, respectively, and engages the rear cross member 113 from above. Each rear mounting piece 123a, 123b is secured to the rear cross member 113 by being wrapped around the front cross member 115 from above.

The vehicle seat 101 (see FIG. 12) is fitted with a seat belt reminder (SBR) system that issues a warning when the occupant fails to wear the seat belt, and is provided with a pressure sensor 120 for the SBR system. The pressure sensor 120 is placed in a laterally central part of a boundary region between the front portion 115b and the rear portion 115a of the main body 115 to detect the pressure applied to the seat cushion 102, and detect the seating of an occupant on the vehicle seat 101.

Since the inclined portions 116 divert the loading of the occupant, the pressure applied to the rear portion 115a of the main body 115 when an occupant is seated on the vehicle seat 101 is reduced. Therefore, to minimize the influences of the diversion of the pressure of the occupant due to the inclined portions 116, the pressure sensor 120 is positioned so as to be forwardly offset from the inclined portions 116, or so as to be aligned with the front edges of the inclined portions 116 in side view. As a result, the accuracy of the determination of the seating of an occupant by a seating determination means (not shown in the drawings) consisting of ECU or the like based on the signal from the pressure sensor 120 can be improved.

The rear portion 115a of the main body 115 is provided with three openings (including a central opening 122 which is laterally centrally located and a pair of outer openings 123 located on either side of the central opening 122) for engaging a plurality of hooks (not shown in the drawings) connected to the skin member 109, and adjusting the bending stiffness of the internal support member 107. The central opening 129, and the outer openings 123 are rectangular in shape in plan view.

The central opening 122 and the outer openings 123 have a same longitudinal width, but the central opening 122 has a greater lateral width than the outer openings 123. Therefore, the central part of the internal support member 107 has a higher flexibility so that a soft seating feel can be achieved. By thus varying the lateral width of the central opening 122 from the lateral width of the outer openings 123, the deflection of the internal support member 107 can be adjusted so that the seating comfort can be improved. The first longitudinal wire 119a passes laterally centrally through the central opening 122 so that the mechanical strength of the part of the main body 115 surrounding the central opening 122 can be reinforced. Since the rear edge of the skin member 109 can be engaged by the internal support member 107, a projection or the like for forming an engagement portion is not required to be provided on the seat cushion frame 106 so that the weight and size of the seat cushion frame 106 can be minimized.

The rear edge parts of the main body 115 located behind the central opening 122 and the outer openings 123 are provided with respective hook recesses 124 which are recessed toward the back side thereof. Each hook 121 is passed through each of the central opening 122 and the outer openings 123 from the back side to the front side thereof, and is received by the corresponding hook recess 124 at the tip end of the hook 121. Since the tip ends of the hooks 121 are received by the hook recesses 124 of the central opening 122 and the outer openings 123, respectively, the hooks 121 can be positioned properly relative to the central opening 122 and the outer openings 123. Since the central opening 122 and the outer openings 123 are positioned so as to align with the inclined portions 116 or in the part of the main body 115 having a relatively high stiffness, the deformation of the central opening 122 and the outer openings 123 can be minimized so that the inadvertent dislodgement of the hooks 121 from the central opening 122 and the outer openings 123 can be avoided.

Each inclined portion 116 is provided with a first clip mounting hole 125 which is passed through the inclined portion 116 in the vertical direction. Each side part of the front portion 115b of the main body 115 is provided with a pair of second clip mounting holes 126. Clips 127 retaining other members can be secured to the first clip mounting hole 125 and the second clip mounting holes 126 from the back side. If the tip end of any one of the clips 127 should project from the front side of the internal support member 107, the seating comfort may be impaired. To avoid this problem, the first clip mounting hole 126 is formed in a recess 128 which is recessed toward the back side of the inclined portion 116.

Each rear second clip mounting hole 126 formed in the corresponding side part of the front portion 115b of the main body 115 is prevented from causing the tip end of the clip 127 to undesirably protrude from the front side of the main body 115 owing to a flange 129 that projects upward from the corresponding side edge of the front portion 115b, and owing to the positioning of the front second clip mounting hole 127 adjacent to the inclined portion 116. Each front second clip mounting hole 127 formed in the corresponding side part of the front portion 115b of the main body 115 is prevented from causing the tip end of the clip 127 to undesirably protrude from the front side of the main body 115 owing to the positioning of the front second clip mounting hole 127 in a shallow recess 130 which is formed in the front portion 115b so as to be recessed toward the back side.

Each side edge of a part of the internal support member 107 located ahead of the corresponding inclined portion 116 and at the rear end of the front portion 115b of the main body 115 is provided with a side notch 131. Owing to the presence of the side notches 131, the size and weight of the internal support member 107 can be reduced.

Since the side notch 131 is provided, and a longitudinally intermediate part of the corresponding side edge of the front portion 115b is located laterally outward of the corresponding lateral edge of the front mounting portion 117, the front portion 115b is provided with a wing portion 132 which extends in the laterally outer direction. The wing portion 132 is not inclined relative to the laterally middle part of the front portion 115b, as opposed to the inclined portion 116.

The wires 119 buried in the plastic material forming the internal support member 107 include those extending longitudinally and those extending laterally, in mutually spaced relationship in each case, for the purpose increasing the stiffness of the internal support member 107. In the illustrated embodiment, the wires 119 include a first longitudinal wire 119a extending longitudinally along a laterally middle part of the internal support member 107, and a pair of second longitudinal wires 119b extending longitudinally along either side of the first longitudinal wire 119a, a pair of third longitudinal wires 119c each extending longitudinally along the laterally outer side of the corresponding first clip mounting hole 125, a first lateral wire 119d extending laterally in a front part of the front portion 115b, a second lateral wire 119e extending laterally in a front part of the rear portion 115a, a third lateral wire 119f extending laterally in a longitudinally middle part of the rear portion 115a, a fourth lateral wire 119g extending laterally in a rear part of the rear portion 115a, and a fifth lateral wire 119h extending in front of and behind each first clip mounting hole 125.

Each second longitudinal wire 119b passes partly through the corresponding inclined portion 116, and the two ends of each of the second to the fourth lateral wires 119e to 119f are located in the inclined portions 116. Looped parts of the wires 119 are formed by the first longitudinal wire 119a and the second longitudinal wires 119b, and the first to the fourth lateral wires 119d to 119g. Each clip mounting hole 126 is surrounded by a part of the second longitudinal wire 119b, the third longitudinal wire 119c, and the fifth lateral wire 119h.

Figure 14:
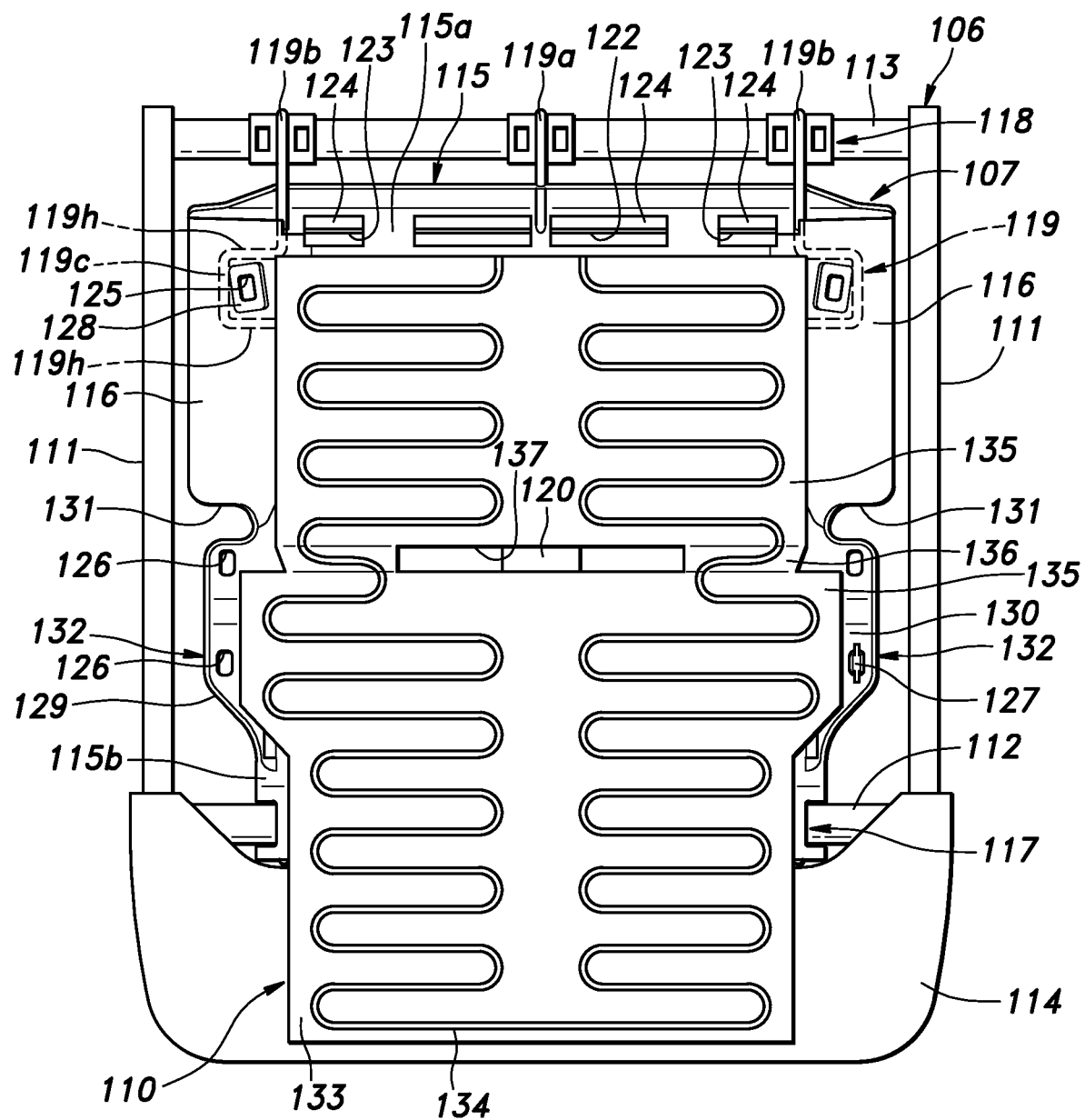
FIG. 14 is a plan view of the internal support member and a seat heater.

As shown in FIG. 14, the seat heater 110 includes a base cloth 133 partly covering the internal support member 107 and the pan frame 114 from above via the pad 108 (see FIG. 15), and a heat wire 134 secured to the base cloth 133. The base cloth 133 includes a pair of main portions 135 extending substantially along the seat surface one behind the other, and a pair of connecting portions 136 connecting the two main portions 135 one laterally next to each other. The main portions 135 and the two connecting portions 136 thus define a central opening 137. The heat wire 134 extends in the longitudinal direction in a zig-zag pattern so as to double back at the front end of the base cloth 133. The two terminal ends of the heat wire 134 located in a rear end part of the base cloth 133 are electrically connected to the electric system of the vehicle V.

The front edge of the base cloth 133 is located behind the front edge of the pan frame 114, the rear edge of the base cloth 133 is located ahead of the central engagement hole 122 and the outer engagement holes 123. Since the base cloth 133 does not cover the central engagement hole 122 and the outer engagement holes 123 from above, the assembly worker is able to see the central engagement hole 122 and the outer engagement holes 123 so that the work efficiency in securing the hooks 121 connected to the rear edge of the skin member 109 can be improved. The side edges of the base cloth 133 are located laterally inward of the side edges of the internal support member 107 and the pan frame 114. Since the base cloth 133 is entirely supported by the internal support member 107 and the pan frame 114 via the pad 108 in this manner, the bending load applied to the seat heater 110 can be reduced as compared to the case where the side edges of the base cloth 133 are located laterally outward of the side edges of the internal support member 107 and the pan frame 114.

The lateral side edges of the base cloth 133 are located laterally inward of the first clip mounting holes 125 and the second clip mounting holes 126. Therefore, the base cloth 133 does not cover the first clip mounting holes 125 and the second clip mounting holes 126 so that the base cloth 133 is prevented from being affected by the stress caused by surface irregularities due to the tip ends of the clips 127, and the recesses 128, 130 provided around the first clip mounting holes 125 and the second clip mounting holes 126, and the bending load on the seat heater 110 can be minimized.

The lateral edges of the base cloth 133 are located laterally outward of the corresponding second longitudinal wires 119b, the front edge of the base cloth 133 is located forward of the first lateral wire 119d, and the rear edge of the base cloth 133 is located behind the third lateral wire 119f, or more preferably behind the fourth lateral wire 119g. Annular portions are created by cooperation of two of the first longitudinal wire 119a and the second longitudinal wires 119b, and two of the first to the fourth lateral wires 119d to 119d. The base cloth 133 covers the first and the second longitudinal wires 119a and 119b, and the first to the third wires 119d to 119f or the first to the fourth lateral wires 119d to 119g, or some of the wires form loops so that the deformation of the base cloth 133 is restricted, and the bending stress applied to the seat heater 110 can be reduced. The third longitudinal wire 119c located in each inclined portion 116 is located laterally outward of the corresponding lateral side edge of the base cloth 133 so that the bending stress applied to the seat heater 110 can be reduced.

Figure 15:
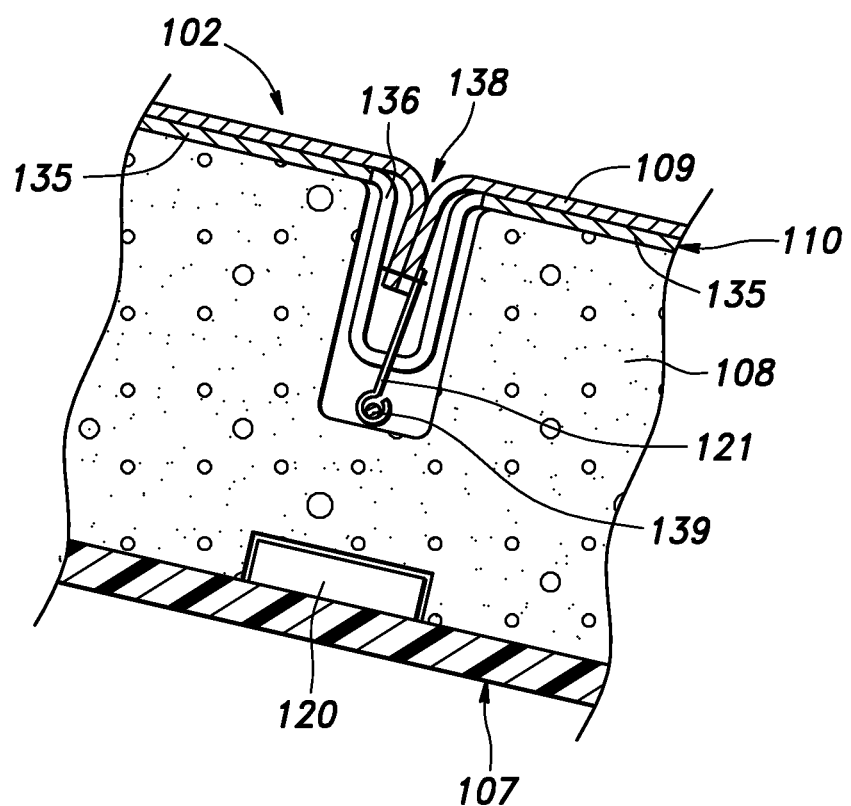
FIG. 15 is a fragmentary sectional view of a fixation position where the skin member is pulled toward the backside of the seat cushion.

As shown in FIG. 15, the connecting portion 136 deflects, and pulled into the seat cushion 102 in the fixation position 138 of the skin member 109 where the skin member 109 is pulled into the seat cushion frame 106. Therefore, even when the connecting portion 136 is pulled in the longitudinal direction, the longitudinal tensile force acting on the connecting portion 136 is reduced owing to the straightening of the deflected connecting portion 136. As a result, the load on the heat wire 134 in the connecting portion 136 can be mitigated.

The lower end of the fixation position 138 of the skin member 109 is provided with a hook 121. The hook 121 is engaged by a wire-like engagement member 139 secured to the seat cushion frame 106 of the internal support member 107. The fixation position 138 overlaps with the pressure sensor 120 in plan view. Since the fixation position 138 of the skin member 109 is readily deformable under the loading of an occupant, the stress is efficiently transmitted to the pressure sensor 120 which is located directly under the fixation position 138 of the skin member 109 so that the pressure sensor 120 can detect the pressure with a high sensitivity. The opening 137 of the base cloth 133 overlaps with the pressure sensor 120 in plan view so that the pressure sensor may be protected from the influences of the heat emitted from the heat wire 134.

Owing to such considerations, the bending load on the seat heater 110, and the loading to the heat wire 134 is reduced so that the damage to the heat wire 124 during use can be minimized.

The present invention has been described in terms of specific embodiments, but is not limited by such embodiments, and can be modified in various ways without departing from the spirit of the present invention. For instance, the engaging structure for the edges of the skin member may be other than hooks, such as clips. Some of the ribs of the internal support member may be omitted so that the overall flexibility of the internal support member may be increased. When some of the ribs are omitted, the required stiffness can be achieved by increasing the thickness of the internal support member. The elongated member may also be secured to other parts of the seat such as the side members having a high stiffness, instead of the inclined portions. Many of the features of the present invention are applicable to seat backs as well as to seat cushions. The vehicle seat of the present invention can also be applied to seats of other forms of vehicles such as aircraft and watercraft. Instead of the clip mounting holes and/or the tubular portions, projections configured to engage clips may be provided on the back side of the internal support member. Also, the base cloth may include three or more main portions, and a pair of adjoining main portions may be connected to each other by one connection portion or by three or more connecting portions.

The invention claimed is:

1. A vehicle seat having a seat cushion and a seat back, the vehicle seat comprising:
a frame provided in at least one of the seat cushion and the seat back;
an internal support member for supporting an occupant, the internal support member including a main body in plate or sheet form positioned within the frame and extending substantially in parallel with the frame, and a pair of inclined portions extending laterally outward from at least a part of either lateral side of the main body with a slant away from the frame;
a pad placed on a front side of the frame and the internal support member;
a skin member covering the pad; and
a clip securing another member to one of the inclined portions;
wherein the one inclined portion is formed with a tubular portion projecting from a back side thereof orthogonally to the main body, the tubular portion internally defining a mounting hole receiving the clip therein.

2. The vehicle seat according to claim 1, wherein the mounting hole is passed through the one inclined portion, and a shoulder surface facing toward a front side of the one inclined portion is formed in an inner circumferential surface of the tubular portion, and the clip is passed into the mounting hole from a back side of the internal support member to be engaged by the shoulder surface and retain the other member on the back side of the internal support member.

3. The vehicle seat according to claim 1, wherein the other member is an elongated member which extends in a longitudinal direction.

4. The vehicle seat according to claim 3, wherein the inclined portions are each provided with a plurality of mounting holes.

5. The vehicle seat according to claim 4, wherein the mounting holes provided in the inclined portions are laterally offset from one another.

6. The vehicle seat according to claim 4, wherein the mounting holes provided in the inclined portions are longitudinally offset from one another.

7. The vehicle seat according to claim 1, wherein each inclined portion is provided with a longitudinal end reinforcing portion including an upright wall extending substantially perpendicularly from a longitudinal end of the inclined portion toward the back side of the inclined portion, a bottom wall extending from a free end of the upright wall in the longitudinally outward direction or at an angle to the longitudinally outward direction along an extension plane of a surface of the inclined portion, and a reinforcing wall fixedly connected to the upright wall and the bottom wall substantially in an orthogonal relationship.

* * * * *